US011709352B2

(12) United States Patent
Cheng et al.

(10) Patent No.: US 11,709,352 B2
(45) Date of Patent: Jul. 25, 2023

(54) DARK-FIELD MID-INFRARED PHOTOTHERMAL MICROSCOPY

(71) Applicant: Trustees of Boston University, Boston, MA (US)

(72) Inventors: Ji-Xin Cheng, Newton, MA (US); Celalettin Yurdakul, Brighton, MA (US); Haonan Zong, Allston, MA (US); M. Selim Ünlü, Newton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 17/704,896

(22) Filed: Mar. 25, 2022

(65) Prior Publication Data

US 2022/0308327 A1 Sep. 29, 2022

Related U.S. Application Data

(60) Provisional application No. 63/165,890, filed on Mar. 25, 2021.

(51) Int. Cl.

| | |
|---|---|
| ***G02B 21/16*** | (2006.01) |
| ***G02B 21/02*** | (2006.01) |
| ***G02B 21/36*** | (2006.01) |

(52) U.S. Cl.

CPC ........... *G02B 21/16* (2013.01); *G02B 21/025* (2013.01); *G02B 21/361* (2013.01)

(58) Field of Classification Search

None

See application file for complete search history.

(56) References Cited

U.S. PATENT DOCUMENTS

| | | | |
|---|---|---|---|
| 5,220,403 | A | 6/1993 | Batchelder et al. |
| 5,854,674 | A | 12/1998 | Lin |
| 2006/0197946 | A1 | 9/2006 | Biellak et al. |
| 2007/0019856 | A1 | 1/2007 | Furman et al. |
| 2009/0137908 | A1 | 5/2009 | Patwardhan |
| 2013/0338627 | A1 | 12/2013 | Rylander et al. |
| 2013/0342902 | A1 | 12/2013 | Krueger et al. |
| 2015/0111216 | A1 | 4/2015 | Delahunt et al. |

(Continued)

OTHER PUBLICATIONS

Avci, O. et al., "Pupil function engineering for enhanced nanoparticle visibility in wide-field interferometric microscopy," Optica 4, 247-254 (2017).

(Continued)

*Primary Examiner* — Eileen M Adams

(74) *Attorney, Agent, or Firm* — Burns & Levinson LLP; Steven M. Mills

(57) ABSTRACT

Microscopic analysis of a sample includes a system using dark-field illumination. A mid-IR optical source generates a mid-infrared beam, which is directed onto the sample to induce a temperature change by absorption of the mid-infrared beam. A visible light source generates a light illuminating the sample on a substrate and creating a scattered field and a reflected field along a collection path of the system. A pupil mask is positioned along the collection path to block the reflected field while allowing the scattered field to pass therethrough. A camera is positioned at an end of the collection path to collect the scattered field and generate a dark-field image of the sample.

19 Claims, 23 Drawing Sheets

(56) References Cited

U.S. PATENT DOCUMENTS

| | | | | |
|---|---|---|---|---|
| 2016/0249812 | A1 | 9/2016 | Wang et al. | |
| 2018/0259553 | A1 | 9/2018 | Yang et al. | |
| 2019/0113731 | A1* | 4/2019 | Betzig | G02B 21/0076 |
| 2019/0162647 | A1 | 5/2019 | Unlu et al. | |
| 2020/0025677 | A1 | 1/2020 | Prater et al. | |
| 2021/0010949 | A1* | 1/2021 | Xu | G01N 21/45 |
| 2021/0215601 | A1* | 7/2021 | Prater | G02B 21/06 |
| 2022/0094912 | A1* | 3/2022 | Lee | H04N 19/176 |
| 2022/0197002 | A1* | 6/2022 | Cang | G02B 21/008 |

OTHER PUBLICATIONS

Bai, Y. et al., "Ultrafast chemical imaging by widefield photothermal sensing of infrared absorption," Sci. Adv. 5 (2019).

Baker, M. J. et al., "Using fourier transform IR spectroscopy to analyze biological materials," Nat. Protocols 9, 1771 (2014).

Bohren, C. F. and Huffman, D. R., Absorption and scattering of light by small particles (John Wiley & Sons, 2008), [Introduction and Chapter 14, 55 pgs.].

Braslavsky, I. et al., "Objective-type dark-field illumination for scattering from microbeads," Appl. Opt. 40, 5650-5657 (2001).

Cariou, J. M. et al., "Refractive-index variations with temperature of pmma and polycarbonate," Appl. Opt. 25, 334-336 (1986).

Cheng, C.-Y. et al., "High-speed imaging and tracking of very small single nanoparticles by contrast enhanced microscopy," Nanoscale 11, 568-577 (2019).

Cheng, J.-X. and Xie, X. S., "Vibrational spectroscopic imaging of living systems: An emerging platform for biology and medicine," Science 350 (2015).

Dazzi, A. and Prater, C. B., "AFM-IR: Technology and applications in nanoscale infrared spectroscopy and chemical imaging," Chem. Rev. 117, 5146-5173 (2017). PMID: 27958707.

Dazzi, A. et al., "AFM-IR: Combining atomic force microscopy and infrared spectroscopy for nanoscale chemical characterization," Appl. Spectrosc. 66, 1365-1384 (2012). PMID: 23231899.

Fajardo, M. E. et al., "Using mid-infrared external reflectance spectroscopy to distinguish between different commercially produced poly [methyl methacrylate](pmma) samples—a null result," in AIP Conference Proceedings, vol. 1979 (AIP Publishing LLC, 2018), p. 130003.

García de Abajo, F. J. and Howie, A., "Retarded field calculation of electron energy loss in inhomogeneous dielectrics," Phys. Rev. B 65, 115418 (2002).

Huth, F. et al., "Nano-FTIR absorption spectroscopy of molecular fingerprints at 20 nm spatial resolution," Nano Lett. 12, 3973-3978 (2012). PMID: 22703339.

Khanal, D. et al., "Bulk to nanometer-scale infrared spectroscopy of pharmaceutical dry powder aerosols," Anal. Chem. 92, 8323-8332 (2020). PMID: 32406232.

Kim, S. et al., "Multiplexed single-molecule assay for enzymatic activity on flow-stretched dna," Nat. methods 4, 397-399 (2007).

Klementieva, O. et al., "Super-resolution infrared imaging of polymorphic amyloid aggregates directly in neurons," Adv. Sci. 7, 1903004 (2020).

Levin, I. W. and Bhargava, R., "Fourier transform infrared vibrational spectroscopic imaging: Integrating microscopy and molecular recognition," Ann. Rev. Phys. Chem. 56, 429-474 (2005). PMID: 15796707.

Li, C. et al., "Mid-infrared photothermal imaging of active pharmaceutical ingredients at submicrometer spatial resolution," Anal. Chem. 89, 4863-4867 (2017). PMID: 28398722.

Li, X. et al., "Fingerprinting a living cell by raman integrated mid-infrared photothermal microscopy," Anal. Chem. 91, 10750-10756 (2019). PMID: 31313580.

Li, Z. et al., "Super-resolution far-field infrared imaging by photothermal heterodyne imaging," The J. Phys. Chem. B 121, 8838-8846 (2017).

Li, Z. et al., "Super-resolution far-field infrared imaging by photothermal heterodyne imaging," The J. Phys. Chem. B 121, 8838-8846 (2017). PMID: 28741348.

Mertz, J., "Introduction to optical microscopy" (Cambridge University Press, 2019), Ch. 10, 26 pgs.

Mertz, J., "Introduction to optical microscopy" (Cambridge University Press, 2019), Ch. 18, 23 pgs.

Novotny, L. and Hecht, B., Principles of Nano-Optics (Cambridge University Press, Cambridge, 2006), Introduction, pp. 1-12.

Olson, N. E. et al., "Simultaneous optical photothermal infrared (O-PTIR) and raman spectroscopy of submicrometer atmospheric particles," Anal. Chem. 92, 9932-9939 (2020). PMID: 32519841.

Pavlovetc, I. M. et al., "Infrared photothermal heterodyne imaging: Contrast mechanism and detection limits," J. Appl. Phys. 127, 165101 (2020).

Qin, Z. et al., "Spontaneous formation of 2D/3D heterostructures on the edges of 2D ruddlesden-popper hybrid perovskite crystals," Chem. Mater. 32, 5009-5015 (2020).

Samolis, P. D. and Sander, M. Y., "Phase-sensitive lock-in detection for high-contrast mid-infrared photothermal imaging with sub-diffraction limited resolution," Opt. Express 27, 2643-2655 (2019).

Schnell, M. et al., "All-digital histopathology by infrared-optical hybrid microscopy," Proc.Natl.Acad. Sci. 117, 3388-3396 (2020).

Sevenler, D. et al., "Quantitative interferometric reflectance imaging for the detection and measurement of biological nanoparticles," Biomed. Opt. Express 8, 2976-2989 (2017).

Sowa, Y. et al., "A simple backscattering microscope for fast tracking of biological molecules," Rev. Sci. Instruments 81, 113704 (2010).

Sullenberger, R. M. et al., "Spatially-resolved individual particle spectroscopy using photothermal modulation of mie scattering," Opt. Lett. 42, 203-206 (2017).

Tamamitsu, M. et al., "Label-free biochemical quantitative phase imaging with mid-infrared photothermal effect," Optica 7, 359-366 (2020).

Tamamitsu, M. et al., "Quantitative phase imaging with molecular vibrational sensitivity," Opt. Lett. 44, 3729-3732 (2019).

Toda, K. et al., "Molecular contrast on phase-contrast microscope," Sci. reports 9, 1-7 (2019).

Totachawattana, A. et al., "Vibrational mid-infrared photothermal spectroscopy using a fiber laser probe: asymptotic limit in signal-to-baseline contrast," Opt. Lett. 41, 179-182 (2016).

Waxenegger, J. et al., "Plasmonics simulations with the mnpbem toolbox: Consideration of substrates and layer structures," Comput. Phys. Commun. 193, 138-150 (2015).

Weigel, A. et al., "Dark field microspectroscopy with single molecule fluorescence sensitivity," ACS Photonics 1, 848-856 (2014).

Yurdakul, C. and Ünlü, M. S., "Computational nanosensing from defocus in single particle interferometric reflectance microscopy," Opt. Lett. 45, 6546-6549 (2020).

Yurdakul, C. et al., "High-throughput, high-resolution interferometric light microscopy of biological nanoparticles," ACS Nano 14, 2002-2013 (2020). PMID: 32003974.

Zhang, D. et al., "Bond-selective transient phase imaging via sensing of the infrared photothermal effect," Light. Sci. & Appl. 8, 1-12 (2019).

Zhang, D. et al., "Depth-resolved mid-infrared photothermal imaging of living cells and organisms with submicrometer spatial resolution," Sci. Adv. 2 (2016).

International Search Report and Written Opinion in corresponding Application No. PCT/US2022/021964 dated Jun. 29, 2022 (12 pgs.).

* cited by examiner

FIG. 3C
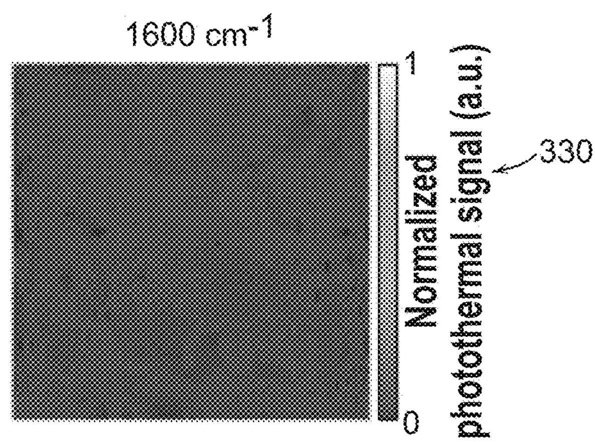
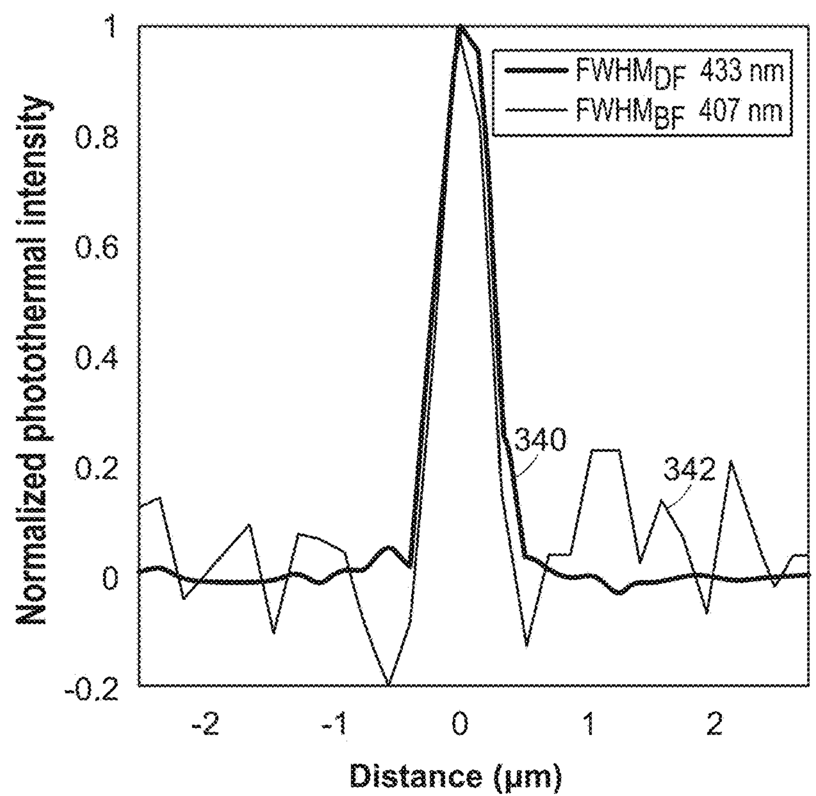
FIG. 3D
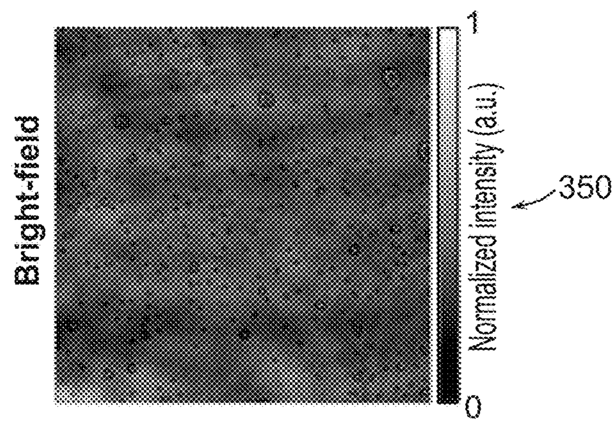
FIG. 3E

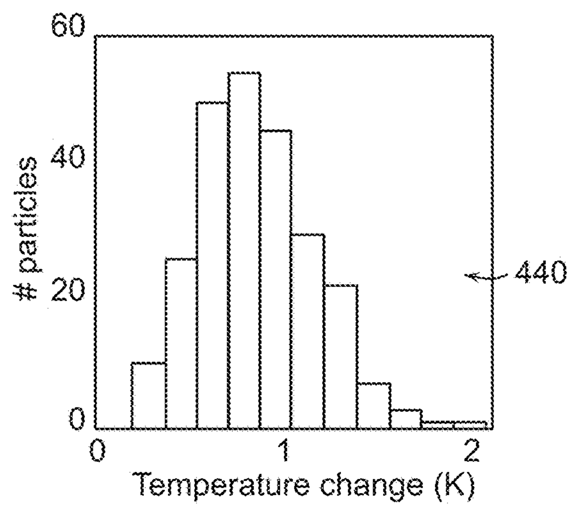
FIG. 4D
FIG. 4E
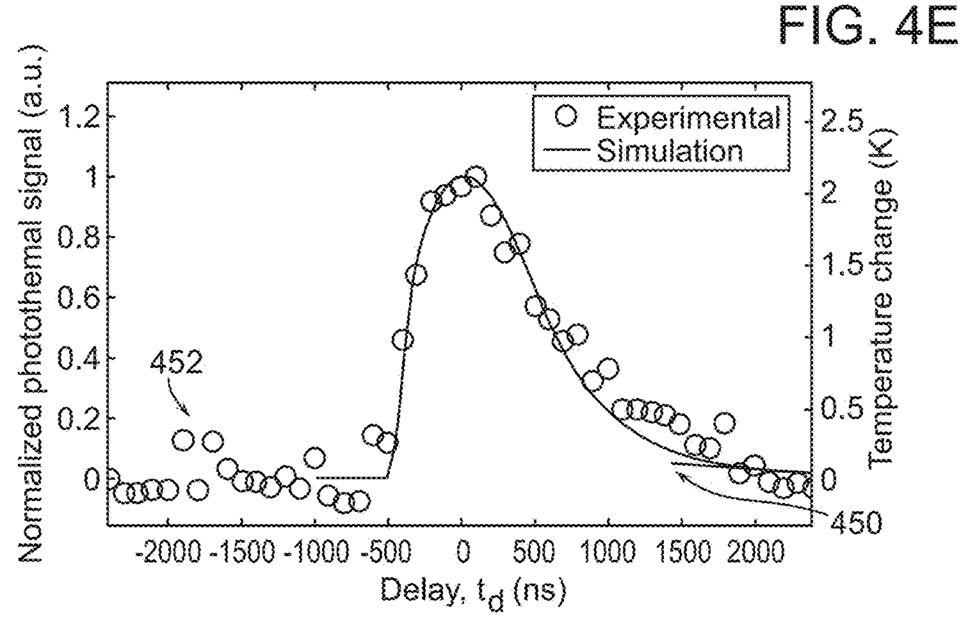
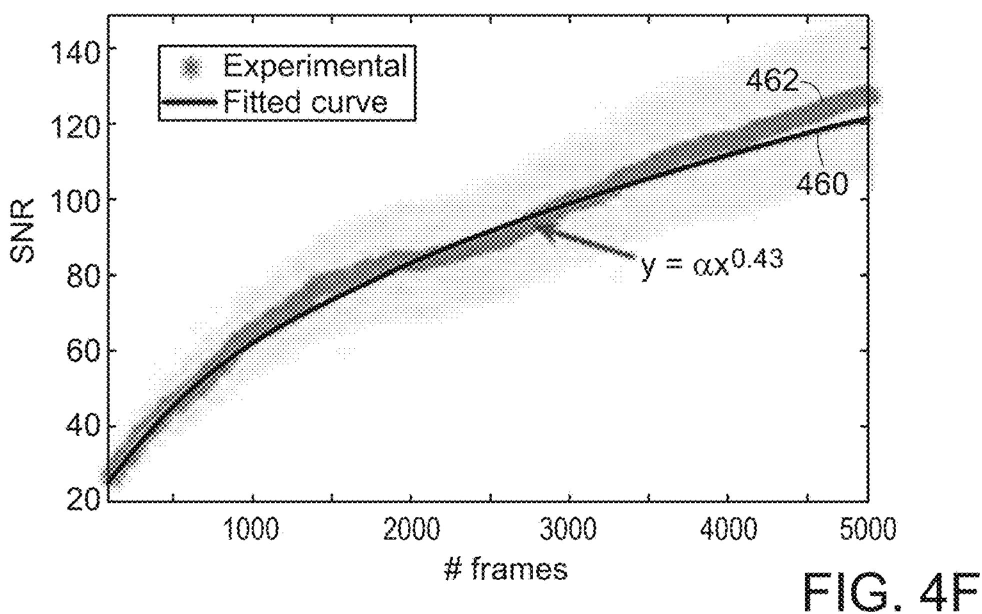
FIG. 4F

FIG. 7C
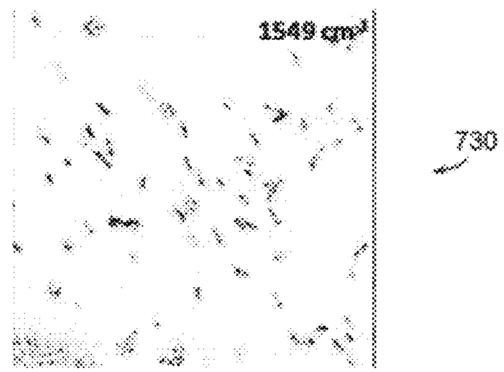
FIG. 7D
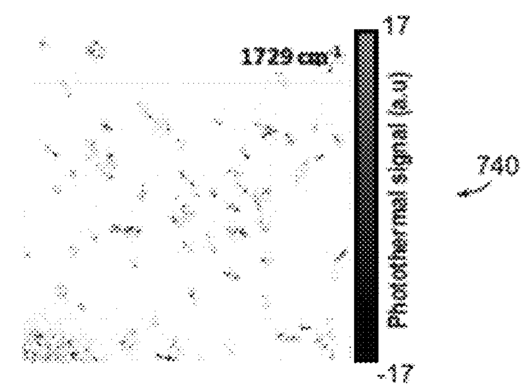
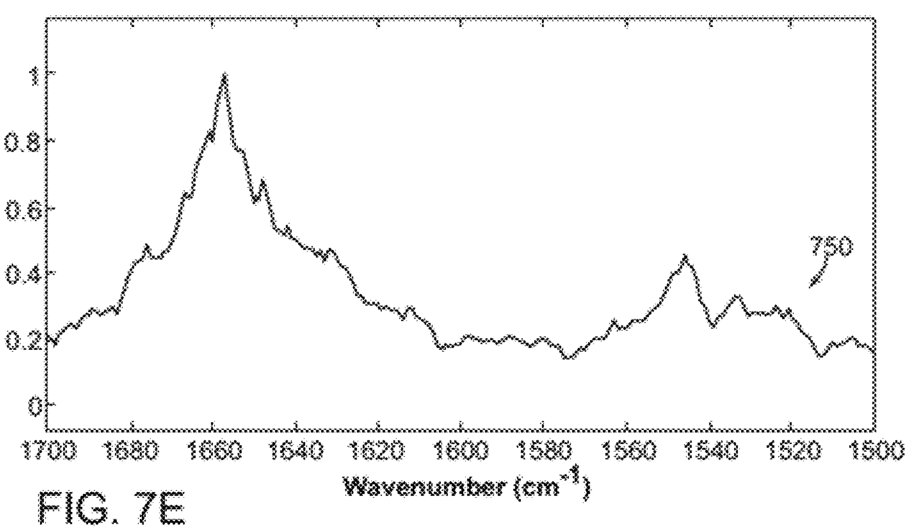
FIG. 7E

| Diameter/nm | $\sigma_{abs\_COMSOL}/\mu m^2$ | $\sigma_{abs\_Mie}/\mu m^2$ |
|---|---|---|
| 100 | $3.8901 \times 10^{-4}$ | $3.8859 \times 10^{-4}$ |
| 200 | $3.1258 \times 10^{-3}$ | $3.1248 \times 10^{-3}$ |
| 300 | $1.0645 \times 10^{-2}$ | $1.0632 \times 10^{-2}$ |
| 500 | $5.0447 \times 10^{-2}$ | $5.0390 \times 10^{-2}$ |
| 1000 | $4.3436 \times 10^{-1}$ | $4.3396 \times 10^{-1}$ |
| 2000 | 3.4489 | 3.4449 |

1310

DARK-FIELD MID-INFRARED PHOTOTHERMAL MICROSCOPY

CROSS-REFERENCE TO RELATED APPLICATIONS

The present application claims the benefit of provisional application No. 63/165,890, filed Mar. 25, 2021.

This invention was made with Government Support under Grant No. CA224844 awarded by the National Institutes of Health. The Government has certain rights in the invention.

BACKGROUND

1. Technical Field

The present disclosure is related to mid infrared (IR) photothermal (MIP) imaging and, in particular, to a system and method for dark-field illumination using oblique illumination and pupil function engineering to block reflected light in a collection arm.

2. Discussion of Related Art

MIP imaging is an emerging technique in which a beam of visible light is used to sense the photothermal lensing effect induced by infrared absorption of molecules. This technology generally provides sub-micron spatial resolution defined by the visible probe beam. Yet, the sensitivity of the wide-field MIP technique is limited by shot-noise of background photons.

SUMMARY

According to one aspect, a system for microscopic analysis of a sample includes a system using dark-field illumination is provided. A mid-IR optical source generates a mid-infrared beam, which is directed onto the sample to induce a temperature change by absorption of the mid-infrared beam. A visible light source generates a light illuminating the sample on a substrate and creating a scattered field and a reflected field along a collection path of the system. A pupil mask is positioned along the collection path to block the reflected field while allowing the scattered field to pass therethrough. A camera is positioned at an end of the collection path to collect the scattered field and generate a dark-field image of the sample.

In some exemplary embodiments, the collection path includes two identical achromatic doublet lenses through which the light illuminating the sample on the substrate passes. The collection path can include a high numerical aperture objective lens. The collection path can also include a CMOS imaging sensor for detecting light along the collection path.

In some exemplary embodiments, the pupil mask is configured to adjust specularly reflected light for optimization of interferometric signal.

In some exemplary embodiments, the pupil mask provides quasi-dark illumination of wavelength size particles while maintaining detector at shot-noise-limit operation so that no reflected light from the substrate reaches the visible light source.

In some exemplary embodiments, the pupil mask provides a photothermal effect broadening the angular distribution of radiation. The broadening of the angular distribution of the radiation can yield a lower directivity compared to dc signal.

In some exemplary embodiments, the pupil mask can block 1:1000 of the reflected light by being placed into a Fourier plane. An absorptive material can be deposited at the center of an optic quality quartz disposed on the pupil mask.

In some exemplary embodiments, the pupil mask centrally houses a dot blocker to block the reflected field. The dot blocker can filter the reflected illuminating light from the substrate. The dot blocker can also have a diameter of 1.6 mm. The dot blocker can block 6% of a pupil while passing a large fraction of collected scattered light. In some exemplary embodiments, a photothermal collected power drop can be 11% for the 1.6 mm blocker. The system for analyzing a sample on a substrate using dark-field illumination can be implemented on most of the standard bright-field objectives.

In some exemplary embodiments, the scattered field is refocused at an objective back pupil conjugate with a left focal plane.

In some exemplary embodiments, the illuminating light reflected from the substrate and refocused at the objective back pupil allows for access to the reflected light at a conjugate plane.

In some exemplary embodiments, the visible light source includes at least one of a narrow-band light source, an LED light source, a monochromatic light source, a laser light source and a visible light source.

According to another aspect, a method for wide-field mid-infrared photothermal microscopy (MIP) for analyzing a sample on a substrate using dark-field illumination is provided. The method includes generating a mid-infrared beam from a mid-infrared (IR) optical source, the mid-infrared beam being directed at the sample to heat the sample; generating a light from a visible light source for, the light illuminating the sample on the substrate and creating a scattered field and a reflected field along a collection path of the system; blocking the reflected field with a pupil mask positioned along the collection path while allowing the scattered field to pass therethrough; and collecting the scattered field with a camera positioned at an end of the collection path and generating a dark-field image of the sample.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 3A-3H include images and graphs of a comparison between dark-field MIP and bright-field MIP imaging of 500 nm PMMA beads on silicon substrate. FIG. 3A is the dark-field cold image. FIG. 3B is the dark-field photothermal image at C═O absorption peak. FIG. 3C is the dark-field photothermal image at off-resonance 1600 cm$^{-1}$. FIGS. 3E-3G are bright-field images corresponding with FIGS. 3A-3C, sharing the same field of view. FIG. 3D is a graph of the cross-section of the selected bead in 3B and 3F. FIG. 3H is a graph of the histograms of the signal to background noise ratio in FIG. 3B.

FIG. 4 include images and graphs of experimental validation of photothermal image formation modeling. FIG. 4D is a graph of the temperature change (ΔT) histogram of the detected 500 nm PMMA beads in FIGS. 3A-3H. FIG. 4E is a graph of the experimental and simulated transient temperature response for 56 particles. FIG. 4F is a graph of the photothermal SNR calculated at different number of frames averaging.

FIG. 5A is a polar plot illustrating the photothermal scattered intensity of the 300 nm PMMA bead on silicon substrate. FIG. 5B is a photothermal image of the 300 nm PMMA beads. FIG. 5C is cropped photothermal images of the 300 and 500 nm PMMA beads mixture. FIG. 5D includes graphs of the cross-section profile of the experimental line 340 in FIG. 4C (top) and the corresponding profile in the cold image (bottom).

FIG. 6A is the dark-field cold image of *S. aureus*. FIGS. 6B-D are the dark-field photothermal images of *S. aureus* at specific wavenumbers for different chemical bonds. FIG. 6E is a graph of the dark-field MIP spectrum of *S. aureus*.

FIG. 7A-7E include images and a graph of multispectral dark-field MIP imaging of *E. coli*, according to some exemplary embodiments. FIG. 7A is the dark-field cold image of *E. coli*. FIGS. 7B-7D are the dark-field photothermal images of *E. coli* at specific wavenumbers for different chemical bonds. FIG. 7E is a graph of the dark-field MIP spectrum of *E. coli*.

DETAILED DESCRIPTION

Figure 1A:
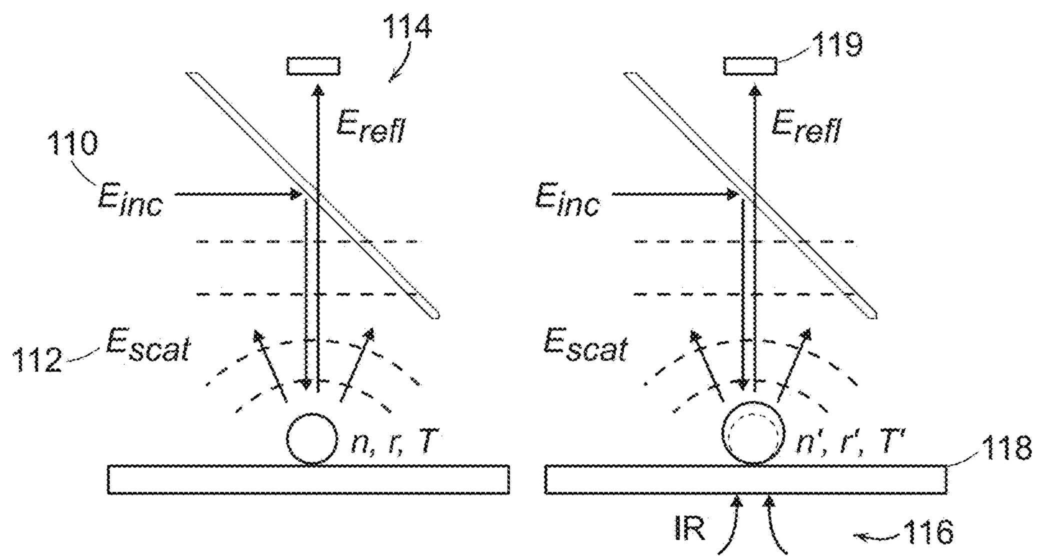
FIG. 1A is a schematic illustrating a photothermal contrast and detection mechanism for particles on top of a substrate.

According to the system and method of the present disclosure, contrast enhancement is utilized to selectively block reflected light through pupil engineering in a collection path. According to the technology of the disclosure, over three orders of magnitude background suppression by quasi-darkfield illumination in epi-configuration without sacrificing lateral resolution is provided. Generally, wide-field MIP modalities have limited sensitivity due to the background shot-noise required to facilitate the desired speed and high-throughput imaging micron-scale samples. According to the present disclosure, this problem is solved by the exemplary embodiments herein, resulting in a 6-fold signal-to-noise ratio improvement, allowing for simultaneous detection and discrimination of hundreds of nanoparticles across a field of view of 70 μm×70 μm.

Chemical imaging plays an increasingly important role in studying biological systems. It combines molecular spectroscopy with high-resolution spatial information to create quantitative images of molecular distributions. The many conventional chemical imaging tools include stimulated Raman scattering microscopy, Fourier Transform infrared (FTIR) spectroscopy, atomic force microscope infrared (AFM-IR) spectroscopy, and transient absorption microscopy. Among these methods, infrared-based imaging approaches are particularly attractive because they can extract molecular-specific information noninvasively and have much larger cross-section, when compared with Raman scattering. Yet, chemical imaging by conventional FTIR is hampered by the intrinsically low spatial resolution on the micron scale. AFM-IR provides nanoscale resolution but is only applicable to extremely flat specimens under ambient conditions. According to the present disclosure, a contact-free, easy to operate, and highly sensitive method for chemical imaging is provided.

Recently developed mid-infrared photothermal (MIP) microscopy offers notable improvements over these traditional tools. However, conventional scanning MIP microscopy, despite its high sensitivity, still possesses three main challenges: (i) Limited imaging speed due to the pixel-by-pixel acquisition; (ii) Wavelength dependent focus mismatch between the IR and visible beams; (iii) Mechanical instabilities and sample drift. Present techniques rely on bright-field sample illumination in which low-contrast signal from sub-wavelength (<500 nm) structures becomes indistinguishable from the background. Such unperturbed illumination dominates the noise in the system in which photothermal signal could be buried under this noise floor. Alternatively, background suppression methods including dark-field illumination could significantly enhance image contrast and thus the sensitivity to wavelength scale samples such as bacteria and organelles. Such configuration in mid-IR photothermal imaging has been demonstrated on 3 μm beads via oblique illumination which has an incident angle larger than the objective's angular range, yet at a very poor resolution of 1.5 μm and low sensitivity.

According to the exemplary embodiments described herein, the present disclosure includes a new contrast-enhancement method in wide-field MIP microscopy via pupil engineering that improves the sensitivity by removing the background signal. This is achieved by selectively blocking the back-reflected light in the collection arm after the objective, enabling dark-field illumination in epi-configuration, which obviates the need for special objectives or condensers as in the off-the-shelf dark-field microscopes. Notably, the dark-field illumination through the objective can be performed via oblique illumination which is blocked using a field stop and on-axis illumination which is blocked by a rod mirror or a circular stop. This objective-type on-axis dark-field illumination blocks only the small fraction of the objective numerical aperture (NA), low-NA part centered around the optical axis. Such illumination can employ high-NA objectives compared to that of the oblique, allowing for more sensitive and high-resolution detection of the back-scattered light from small specimens down to single fluorescent molecules.

In some exemplary embodiments, the present disclosure envisions illuminating a sample with a nearly collimated beam which is refocused at the objective back pupil after the specular reflection from the substrate surface. A custom fabricated blocker can filter out this beam at the pupil's conjugate plane, and it is envisioned that no reflected light reaches the camera. Thereby, such pupil engineering enhances the interferometric contrast in both reflection and transmission modes. In this way, the present disclosure demonstrates more than 6-fold signal-to-noise ratio improvement over a large field of view of 70 μm×70 μm enabling simultaneous photothermal imaging of hundreds of particles at once. Notably, this technique establishes a complete physical model for the photothermal image formation that utilizes boundary element methods and angular spectrum representation framework. This technique can be validated with 300 and 500 nm PMMA beads by providing the transient temperature response for these beads by employing the time-gated pump-probe approach.

Figure 1B:
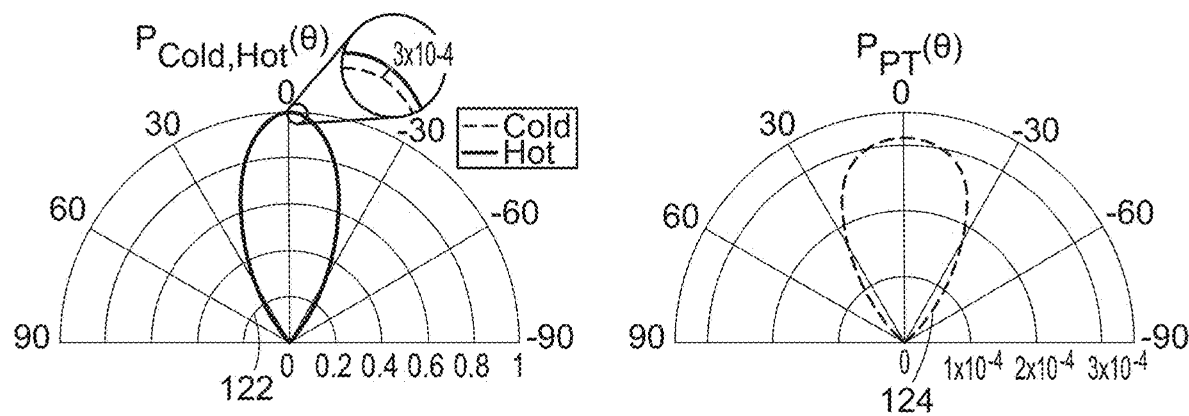
FIG. 1B is a schematic illustrating (left) simulated scattering polar plots of 500 nm PMMA bead on silicon substrate in the hot and cold states and (right) corresponding photothermal polar plot obtained by subtracting hot and cold states.

FIGS. 1A and 1B include diagrams illustrating the photothermal contrast mechanism in dark-field illumination MIP microscopy. In FIG. 1A, a visible laser beam $E_{inc}$ 110 illuminates the sample placed on top of a silicon substrate 118 in the epi-configuration to demonstrate photothermal contrast and detection mechanism for particles on top of a substrate. The incident field scatters off the sample $E_{scat}$ 112 and reflects from the substrate surface $E_{ref}$ 114. Accordingly, the superposition of incident and reflected light constitutes the total driving field of this scattering process. The scattered field is proportional to its optical parameters including refractive index (n) and size (r) along with the illumination wavelength (λ). The dark-field illumination rejects the reflected field in the collection path such that only the scattered fields reach the detector 119. A mid-infrared laser beam 116 vibrationally excites the sample owing to the absorption bonds at the IR illumination wavelength. The IR absorption generates heat and changes the temperature to T' in the sample and its vicinity. This photothermal effect results in a change in the samples refractive index and size which depends on the sample's thermo-optic $$\left(\frac{dn}{dT}\right)$$

and thermal-expansion $$\left(\frac{1}{r}\frac{dr}{dT}\right)$$

coefficients at pre-IR pulse temperature) and hence the scattered field. For reference, IR pulse on and off states are referred to as respectively, "hot" and "cold" frames throughout the present disclosure.

To obtain the photothermal signal, the scattering difference between hot and cold states is measured. FIG. 1B illustrates the normalized radiation profiles of scattering from a 500 nm PMMA bead on the silicon substrate 118. According to the technology of the present disclosure, references to IR pulse on and off states are deemed respectively, "hot" and "cold" frames throughout. The signals are normalized by the maximum intensity value in the cold state: $\theta_{incident}=0°$, $n_{medium}=1 n_{silicon}=4.2$, $n_{PMMA}=1.49$, $dn/dT=-1.1\times10^{-4} K^{-1}$, $dr/dT=90\times10^{-6}$ $mK^{-1}$, $T_0=298$ K. To obtain the photothermal signal, the scattering difference between hot and cold states is measured at 122 and 124, respectively. The zoom-in region indicates the very subtle signal difference (~0.03% for $\Delta T=1K$) between the cold 124 and hot states 122. Here, the photothermal radiation profile has a broadened angular distribution compared with the scattering profiles, suggesting a careful treatment of image formation considering imaging optics is required for accurate photothermal signal modeling. With that, the present disclosure envisions that a theoretical analysis of illumination and collection engineering can be carried out to achieve sensitivity and resolution improvement in the imaging system.

When considering dark-field illuminated epi-detection configuration, only the back-scattered field from the particle is collected by the objective lens within the angular range of the numerical aperture. In some exemplary embodiments, the camera captures the resulting electric field as intensity images ($I_{det}=|E_{scat}|^2$). The photothermal effect induced change in refractive index (Δn) and particle size (Δr) modifies the scattered field. The scattering field change $\Delta E_{scat}=|E_{scat}^{Hot}|-|E_{scat}^{Cold}|$ is very minute, typically three orders of magnitude smaller than the pre-IR pulse scattered field amplitude ($\Delta E_{scat} \ll |E_{scat}|$). With this assumption, the photothermal signal $\Delta I_{det}$ can be approximated as, $\Delta I_{det} \approx 2|E_{scat}|\Delta E_{scat}$. To obtain a generalized photothermal signal quantification, the present disclosure utilizes modulation depth as a fractional change in the scattered intensity ($\Delta I_{det}/I_{det}=2\Delta E_{scat}/|E_{scat}|$) proportional to temperature change (ΔT). Furthermore, $E_{scat}$ can be approximated as $$\frac{dE_{scat}}{dT}\Delta T$$

in the narrow temperature intervals. Notably, this assumption implies that the photothermal signal scales linearly with the $\Delta T$ for a known specimen. Therefore, one can infer temperature change distribution of detected particles using a priori knowledge of the sample's physicochemical parameters.

According to the exemplary embodiments herein, such scattering measurements could bring the system into the shot-noise limited regime where all other noise sources, i.e, electronic and thermal, are negligible. The noise-floor in a single measurement is then dominated by the photon noise of photoelectrons accumulated at the detector during the integration time. This is a valid assumption for particles that generate enough photons ($N_{det}$) to saturate the detector within a given short exposure time. The shot-noise fluctuation is equal to the standard deviation of the detected photons $\sigma_{photon}=\sqrt{N_{det}}$. In such a case, the signal-to-noise ratio (SNR) in the dark-field photothermal signal detection becomes, $SNR=\sqrt{2}\Delta E_{scat}$.

According to another aspect of the present disclosure, the $\sqrt{2}$ constant comes from the fact that the noise in hot and cold images are independent of each other and hence the subtracted image noise scales with the $\sqrt{2N_{det}}$. In this way, the modulation depth limits the sensitivity in a single shot. From eq. 2, the minimum detectable modulation depth should satisfy $\Delta E/|E|>1/\sqrt{2N_{det}}$. The maximum $N_{det}$ is bounded by the camera sensor's pixel well depth ($N_{well}$). Therefore, large pixel depth cameras are desirable in these measurements.

According to the exemplary embodiments described herein, to accurately characterize the photothermal contrast mechanism, the present disclosure provides an analytical model considering imaging optics and system parameters via image field calculations. Notably, this method includes image field representation of optical fields that provide better means for physical optical system simulations. This model is built upon the previously developed theoretical framework for interferometric scattering calculations from an arbitrary shape and size particle near a substrate and extends to the photothermal signal.

The photothermal imaging simulation of the present disclosure is split into two steps: (1) numerical evaluation of far-field scattered field from a particle and (2) calculating image fields using diffraction integrals. To do so, the method first defines the system geometry including the substrate, medium, and particle dielectric functions as well as the illumination wavelength ($\lambda$). The vectorial scattered fields at the infinity ($E_{scat}$, $\infty$) are then calculated using metallic nanoparticle boundary element method (MNPBEM) toolbox. NMPBEM numerically solves full Maxwell's equations for dielectric environment in which the particle and surrounding medium have homogeneous and isotropic dielectric functions. In calculations, it utilizes the boundary element methods (BEM) which is a computationally efficient approach for simple geometries. It should be noted that MNPBEM accounts for the substrate effect on internal and driving electric fields using Green's functions. This is very important for accurate analysis of the total back-scattered field considering the reflections from the surfaces. After numerically calculating the scattered field, the method of the present disclosure performs image formation integrals using angular spectrum representation (ASR) of vectorial electric fields. The ASR framework has been a powerful tool for a rigorous and accurate description of the field propagation in the homogeneous media. The electric field distribution at the image plane can be explained by the superposition of the far-field scattered fields as follows:

$$E_{scat}(x,y,z)=A_0\frac{j}{2\pi}\iint_{\sqrt{k_x^2+k_y^2}\le k_{NA}}\frac{1}{k_z}E_{scat,\infty}\left(\frac{k_x}{k},\frac{k_y}{k}\right)e^{j(k_xx+k_yy+kz_z)}dk_xdk_y$$

where $A_0$ is scaling factor associated with the far-field calculations at the infinity, is $k=\lambda/2\pi$ is wavevector, and $k_z=\sqrt{k^2-k_x^2-k_y^2}$ is the wavevector along the optical axis z. The integral limits impose filtering pupil function defined by objective NA. Therefore, the scattered radiation profile has of great importance for contrast calculations. The image field intensity is then calculated at the camera plane. To incorporate the photothermal effect into the model, the same steps are iterated after updating the particle size and refractive index using the thermo-optic and thermal-expansion coefficients explained above. The simulation geometry is defined for a 500 PMMA bead (n=1.49) placed on top of a silicon substrate (n=4.2). It is assumed by the present disclosure that plane wave illumination ($\lambda$=520) from above. This is a valid approximation for nearly collimated sample illumination in the experiments. To speed up the successive simulations, reflected Green's functions are pre-calculated and stored in the memory.

According to the technology of the present disclosure, this analytical model can be used to investigate the image formation of specific sample with known size and refractive index via photothermal effect simulations. While to investigate the photothermal process, the size and refractive index of both "hot" and "cold" states need to be known. With the known thermo-optic $$\left(\frac{dn}{dT}\right)$$

and thermal-expansion $$\left(\frac{dr}{dT}\right)$$

coefficients, the temperature of "hot" and "cold" state need to be solved. The transient temperature profile for a particle placed on a silicon substrate is simulated in COMSOL Multiphysics.

This simulation requires two steps. First, the present disclosure includes numerically evaluating the absorbed mid-infrared power $P_{abs}$ by a 500 nm PMMA particle. The total absorbed power is related to the mid-infrared beam intensity I and the absorption cross-section $\sigma_{abs}\cdot P_{abs}=\sigma_{abs}\cdot I$. Using the particle's optical parameters including the size and dielectric constant, the absorption cross-section is calculated in the electromagnetic wave, frequency domain module. The mid-infrared beam intensity at the center of the IR focus is input from the experimentally measured power and beam size. In the second step, the present disclosure includes calculating the transient temperature rise using the COMSOL's heat transfer in solids module which takes the pre-calculated absorbed power as an input from the initial step. To do so, the geometry is defined in which the bead sits on top of the substrate. The bead is treated as a uniform heat source, which is reasonable as a result of the roughly uniform absorbed power distribution from the simulation result in the first step. The thermal diffusion process is calculated as the following equations:

$$\rho C_P \frac{\partial T}{\partial t} + \nabla \cdot q = Q$$

$$q = -k\nabla T$$

where ρ is the density of the material, $C_p$ is the heat capacity at constant pressure, T is temperature, t is time, k is the thermal conductivity. The COMSOL's heat transfer in solids module can numerically solve these equations and obtain the temperature distribution in time and space domain of the full system.

According to the exemplary embodiments herein, the present disclosure includes contrast enhanced mid-infrared photothermal microscopy by pupil engineering. In this way, theoretical simulations for temperature dependence of photothermal signal can be conducted. The present disclosure provides back-side IR illumination and topological polarization conversion, and details electromagnetic wave simulations for photothermal effect and transience temperature response in COMSOL.

The present disclosure provides an overview of temperature dependence of photothermal signaling. Since the scattering signal is differentiable in the temperature domain, the derivative of the scattered field $E_{scat}$ can be written as follows:

$$\lim_{\Delta T \to 0} \Delta T \frac{dE_{scat}(T)}{dT} = E_{scat}(T + \Delta T) - E_{scat}(T) \tag{S1}$$

In an illustrative system of the present embodiment, the infrared (IR) absorption can induce the temperature change less than 5 K for a 500 nm PMMA bead. Additionally, it can be numerically demonstrated that the scattered field modulation depth (DE/E) for a 1 K temperature increase is about $10^{-4}$. This modulation depth is determined by the sample's thermo-optic and thermal-expansion coefficients. Applying the chain rule on eq. S1, the modulation depth for $|\Delta E| << |E|$ can be written in a linear form, $$\frac{\Delta E}{E} = \Delta T \frac{dE_{scat}(T)}{dT} = \Delta T\left[\frac{\partial E_{scat}(r, n)}{\partial r}\frac{dr}{dT} + \frac{\partial E_{scat}(r, n)}{\partial n}\frac{dn}{dT}\right] \tag{S2}$$

Figure 8:
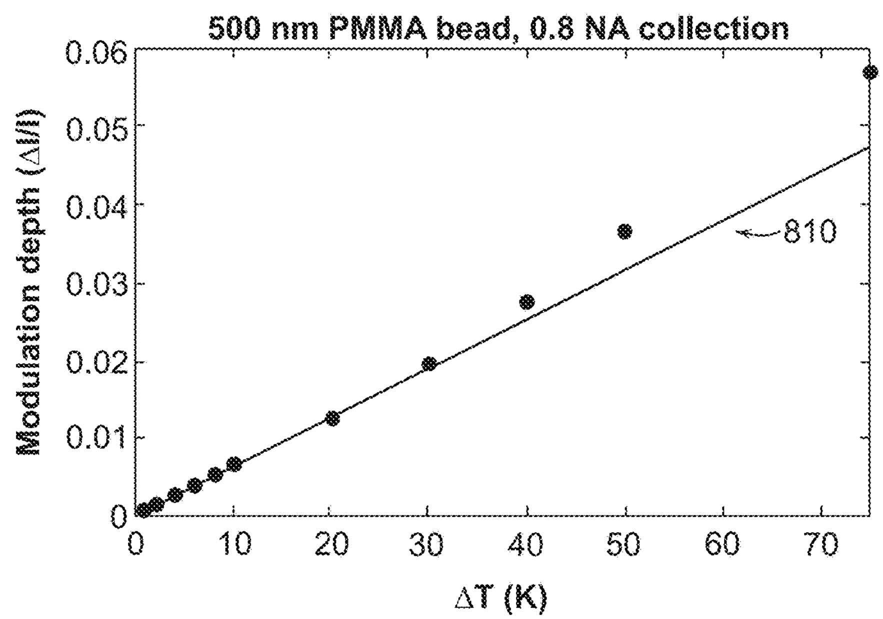
FIG. 8 is a graph illustrating simulated temperature dependence of photothermal signal for 500 nm PMMA bead.
Figure 9:
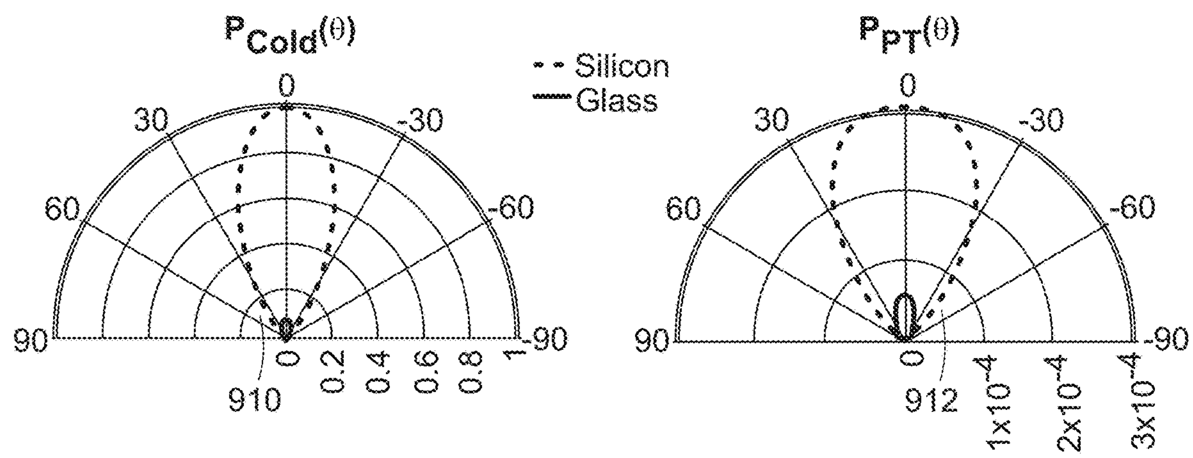
FIG. 9 is a scattering polar plot comparison of 500 nm PMMA bead on silicon and glass substrates.

Together, the assumption in eq. S2 holds true for small temperature changes owing to the sample's linear temperature response and very small thermal coefficients in the −4 orders of magnitude at room temperature. In this way, FIG. 8 is a graph illustrating simulated temperature dependence of photothermal signal for 500 nm PMMA bead (parameters at 520 nm illumination wavelength: simulation parameters: $\theta_{incident}=0°$, $n_{medium}=1n_{silicon}=4.2$, $n_{PMMA}=1.49$, dn/dT=$-1.1\times10^{-4}$ $K^{-1}$, dr/dT=$90\times10^{-6}$ $mK^{-1}$, $T_0=298$ K. The simulated photothermal response curve as a function of ΔT is shown at 810 in FIG. 8. Thereby, the present disclosure points out that this linearity breaks at the large temperature changes of ΔT>30 K. This stems from the fact that photothermal effect induces the strong change in the scattered field. That is to say, the modulation depth should be within the range of 0.01 for the assumption of the scattered field's linear temperature dependence. Otherwise, the modulation depth dependent temperature change calculations can be performed by polynomial curve fitting to the theoretical findings. FIG. 9 further provides a scattering polar plot comparison of 500 nm PMMA bead on silicon and glass substrates. On the left, DC polar plots are normalized with maximum power on the silicon substrate at 910, and on the right, photothermal polar plots calculated from the normalized signals at 912. Again, the simulation parameters are: $\theta_{incident}=0°$, $n_{medium}=1n_{silicon}=4.2$, $n_{PMMA}=1.49$, dn/dT=$-1.1\times10^{-4}$ $K^{-1}$, dr/dT=$90\times10^{-6}$ $mK^{-1}$, $T_0=298$ K.

Figure 10A:
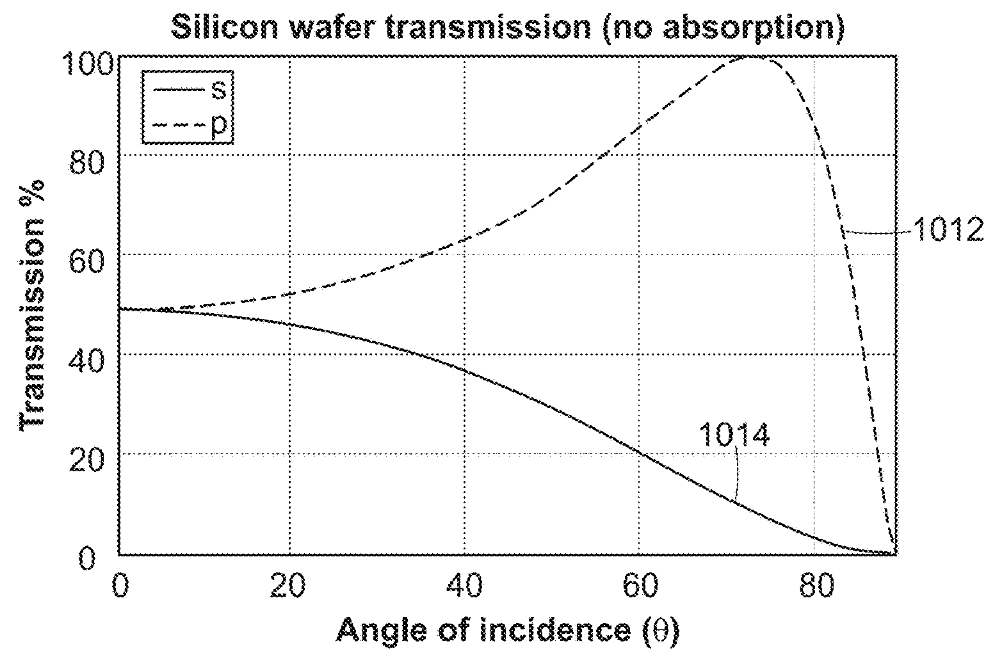
FIG. 10A is a graph of the calculated transmission of silicon substrate for polarized IR beam at various angles of incidence.
Figure 10B:
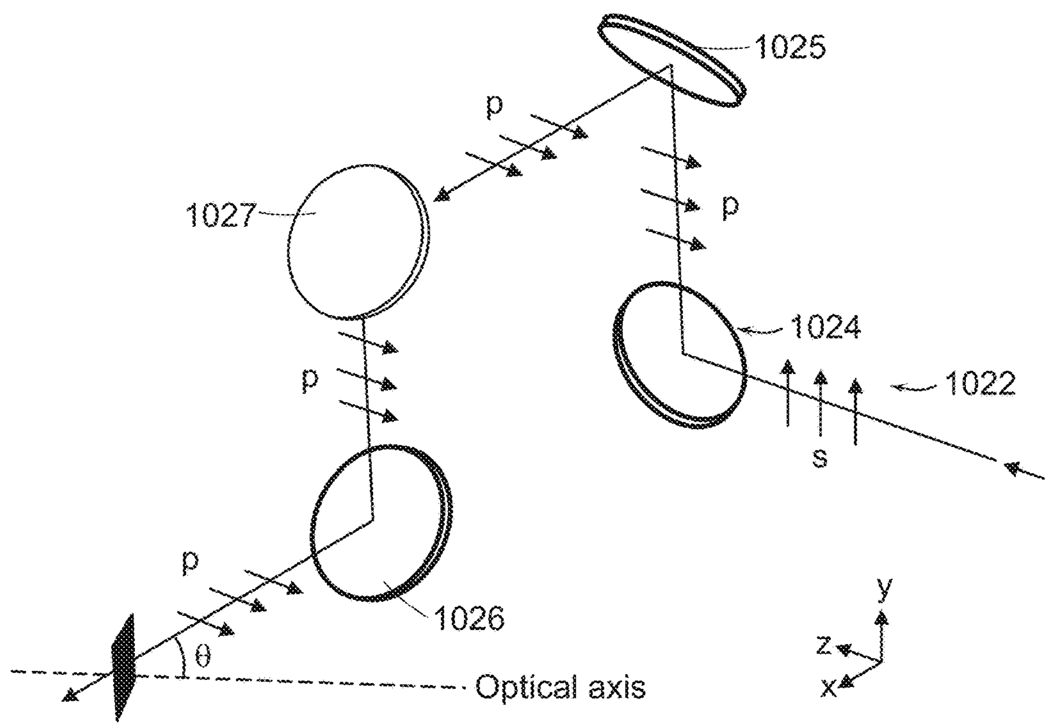
FIG. 10B is a schematic of the topological polarization rotation of IR light from s to p polarization state.
Figure 11:
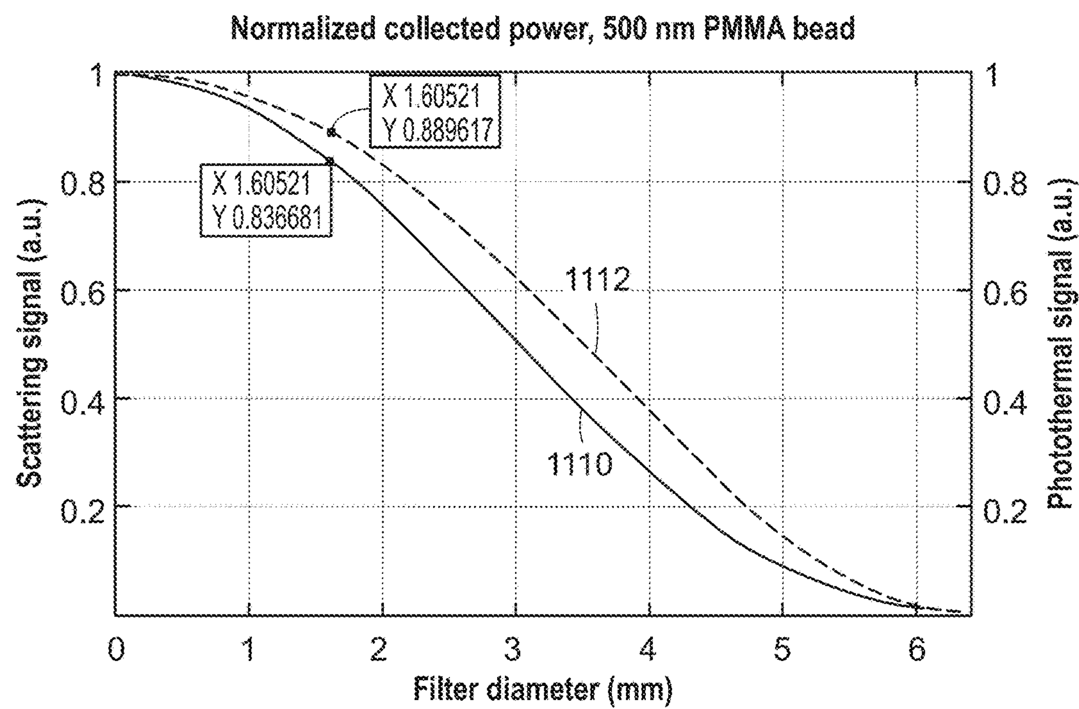
FIG. 11 is a graph of the effect of the blocker size on the collected scattering and photothermal signal power.

According to the exemplary embodiments described herein, the present disclosure provides an overview of temperature dependence of photothermal signaling. FIG. 10A is a graph of the calculated transmission of silicon substrate for polarized IR beam at s 1012 and p 1014 angles of incidence. (simulation parameters: λ=1650 μm, $n_{silicon}=3.4$, $n_{medium}=1$; the imaginary part of silicon refractive index is omitted in the transmission calculations). To improve the transmission on silicon, the present disclosure includes illuminating the substrate at close to the Brewster angle. FIG. 10B is a schematic of the topological polarization rotation of IR light from s top polarization states. The default IR beam output 1022 is linearly polarized along the z-axis which is defined as s polarization state. The s polarized IR light is topologically rotated top polarized state using two 45° gold mirrors at 1024 and 1026, respectively, as shown in in FIG. 10B. The first mirror 1024 reflects the light along the z-axis (vertical). The second mirror 1026 redirects the beam along the x-axis (horizontal). To set the IR beam height without changing the polarization state, the present disclosure includes two 45° gold mirrors facing each other at 1025 and 1027, respectively. The arrangement of the mirrors placed accordingly to this design right after the IR laser output. In this way, an angle of incidence of 61° is achieved, which goes beyond the objective's acceptance angle of 53°. In a single surface, this oblique illumination provides 84% transmission for p polarization compared with 20% transmission in the initial s polarization state. With this configuration, the transmission rate is improved by overall 4-fold. In this way, FIG. 11 is a graph of the effect of the blocker size as a function of filter diameter (mm) on the collected scattering and photothermal signal power at graph lines 1110 and 1112, respectively. The scattered intensity is calculated by BEM simulations of 500 nm PMMA bead on silicon. The total collected power is then calculated by numerically taking the spherical integrals within the angular range of the objective numerical aperture. The blocker diameter D can be converted into the blocked NA using numerical aperture equation ($D\approx2fNA_{block}$). As parameters, the objective has 6.4 mm pupil diameter with 4 mm focal length and 0.8 NA. $\theta_{incident}=0°$, $n_{medium}=1$, $n_{silicon}=4.2$, $n_{PMMA}=1.49$.

According to the exemplary embodiments described herein, the present disclosure provides an overview of COMSOL simulation of transient temperature response of pulsed infrared heating. The COMSOL simulation of the transient temperature rise induced by the pulsed IR beam absorption contains three parts: (1) calculating the sample's absorption cross section ($\sigma_{abs}$), (2) modelling the experimental IR pulse, and (3) simulating the heating process. This is the first step of the simulations. Once the absorption cross section of the sample is known, the absorbed power ($\rho_{abs}$) of the sample can be known based on the intensity (I) of the (pats) heating beam. $\rho_{abs}=\sigma_{abs}$*1. This step is to obtain an approximately representing of the real IR pulse. Once the time dependent heating power density function is decided, the heating process can be simulated in the third step.

Figure 12:
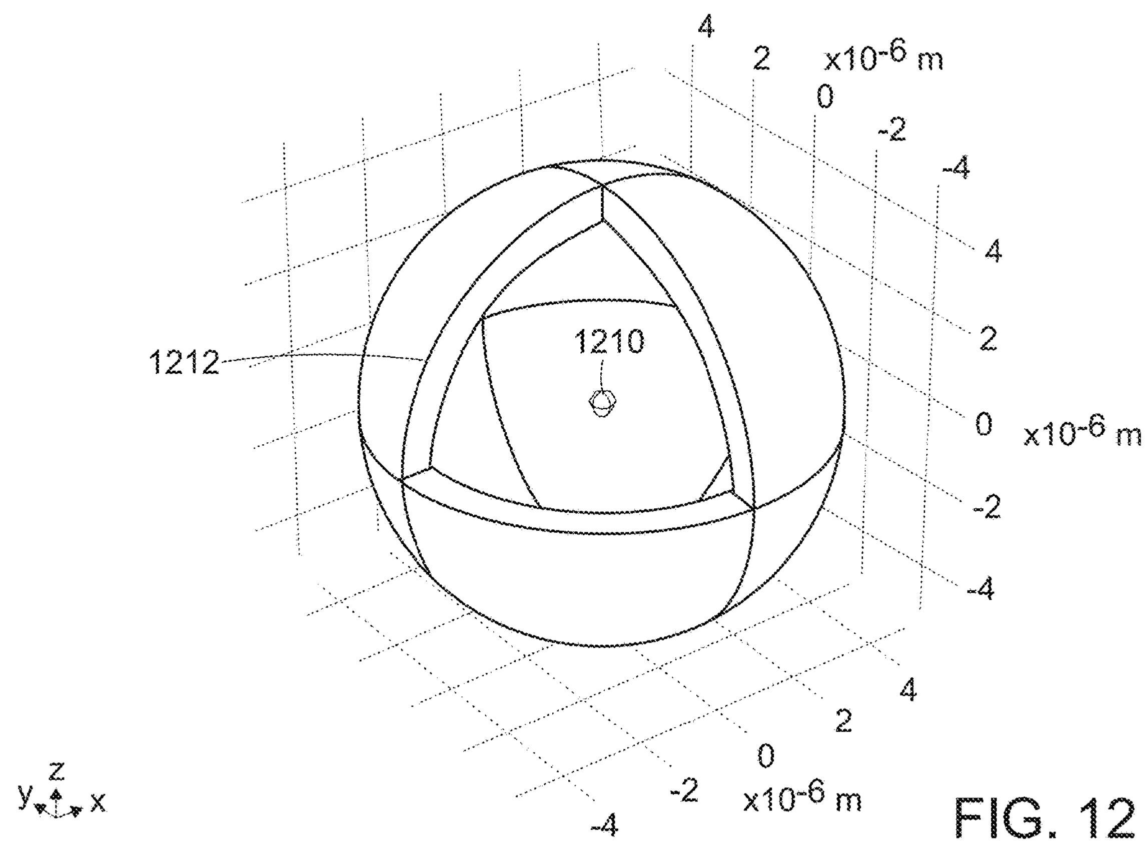
FIG. 12 is a diagram of the geometry for the absorption cross section simulation.

According to the exemplary embodiments described herein, the present disclosure includes calculating the absorption cross section ($\sigma_{abs}$). In this illustrative embodiment, the absorption cross section of PMMA beads with different sizes at IR wavenumber 1729 $cm^{-1}$ were calculated using COMSOL 5.3a, electromagnetic waves, frequency domain. The geometry diagram for the absorption cross section is shown in FIG. 12. The center part 1210 is the PMMA bead with certain diameter, and the surrounding part 1212 is air with a 20 times larger diameter of the bead. In this simulation, the refractive index of PMMA at 1729 $cm^{-1}$ used the value of 1.5+0.46i. Since the focused IR spot size (tens of microns) is much larger than the sub-micron beads, the incident IR beam can be treated as a plane wave. Having the refractive index of the PMMA bead and air and the plane incident wave assumption, the electromagnetic wave equation can be numerically solved by COMSOL. Then, the absorption cross section can be calculated by $$\sigma_{abs} = \frac{1}{T}\int\int_V\int e\omega fd \cdot \hat{Q}e\ dx\ dy\ \hat{d}z,$$

where ewfd. Qe is the electrical power loss density. l is the IR intensity which can be assumed to be any finite value, since it is normalized. The $\sigma_{abs}$ is independent with the value of l.

Figures 13, 14:
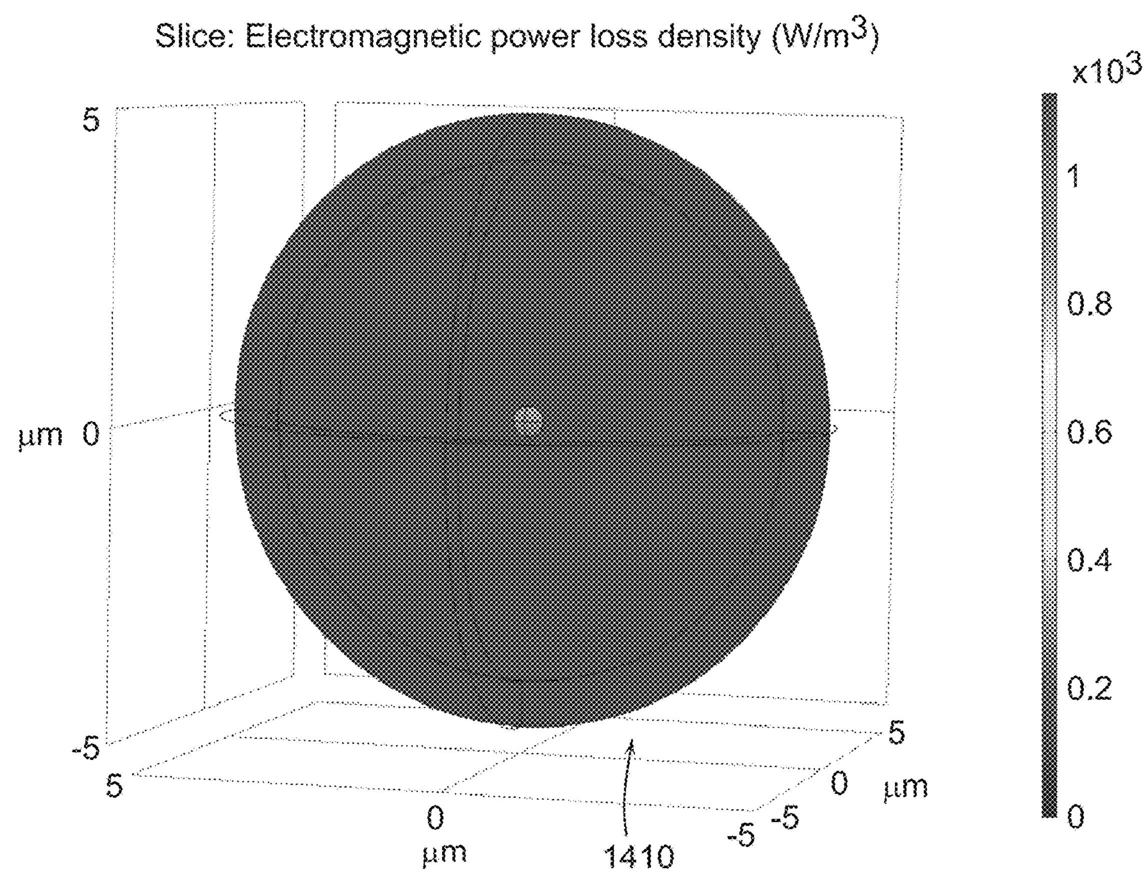
FIG. 13 is a table comparing the COMSOL simulation and Mie scattering calculator results of absorption cross sections of PMMA beads with different sizes.
FIG. 14 is a plot of the COMSOL simulation results of the electromagnetic power loss density distribution of a 500 nm PMMA bead when heated by a 1729 cm$^{-1}$ electromagnetic wave.

The absorption cross section calculations for different PMMA bead sizes are shown in FIG. 13. FIG. 13 includes table 1310 providing a comparison between the COMSOL simulation and Mie scattering calculator results of absorption cross sections of PMMA beads with different sizes. The COMSOL results can be cross-validated with a standard Mie scattering calculation tool. Both results show great agreement with each other. In this simulation, the electromagnetic power loss density distribution, which is also the heating power density distribution is also obtained. FIG. 14 includes a chart 1410 of the COMSOL simulation result of the electromagnetic power loss density distribution of a 500 nm PMMA bead when heated by a 1729 $cm^{-1}$ electromagnetic wave. As shown in FIG. 14, the power density distribution is very uniform for a 500 nm bead, which is due to the relatively small size of the bead compared to the wavelength. To simplify the following parts of the simulation, the heating power density used in the COMSOL simulation is assumed to be exactly uniformly distributed.

Figure 15A:
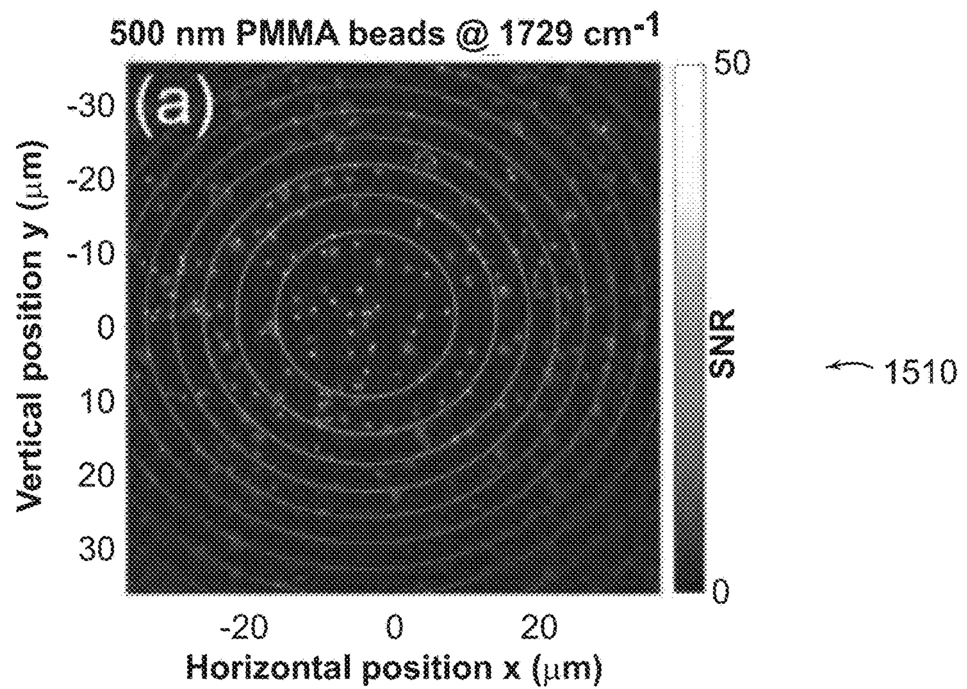
FIG. 15A is an image of the photothermal signal of 500 nm PMMA beads and mesh plot of IR beam's 2D Gaussian fit.

Continuing with the illustrative embodiment, the present disclosure next includes modelling for the real IR pulse. The real experimental IR pulse used is mathematically modeled. The distribution of the IR intensity in space domain can be assumed to be a 2D Gaussian function. To find out the distribution, the beam size of the IR is fitted according to the dark-field MIP SNR image of 500 nm PMMA beads, as seen in 1510 of FIG. 15A. FIG. 15A is an image 1510 of the photothermal signal of 500 nm PMMA beads and mesh plot of IR beam's 2D Gaussian fit.

$$\left(y = \alpha e^{-ln(2)\cdot\left(\frac{x^2}{\sigma_x}+\frac{y^2}{\sigma_y}\right)}\right),$$

Figure 15B:
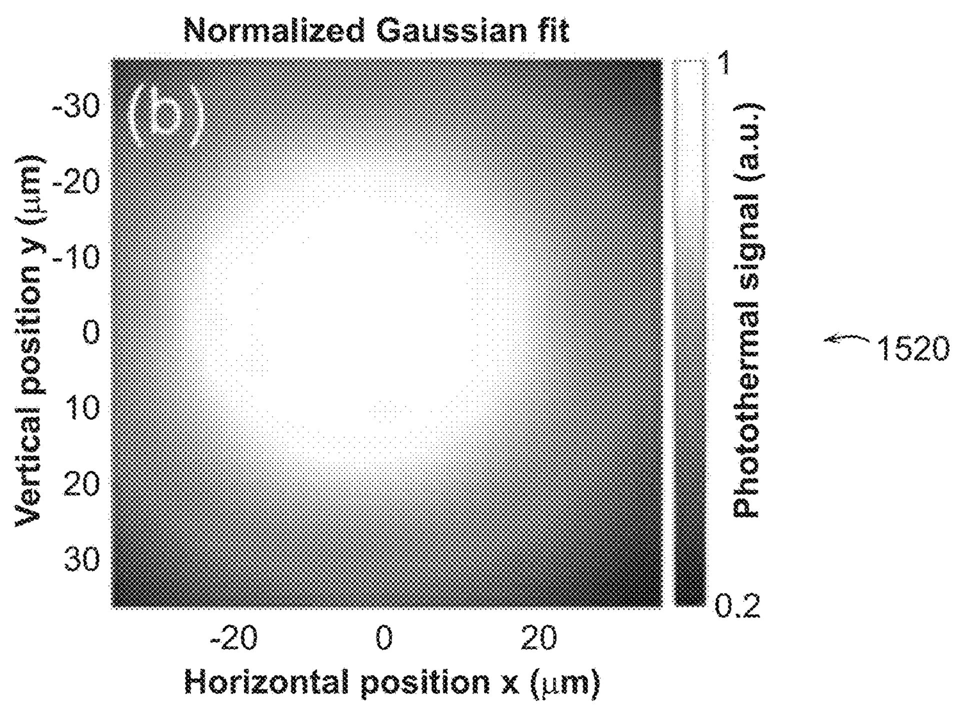
FIG. 15B is an image of the normalized fitted Gaussian beam profile.
Figure 15C:
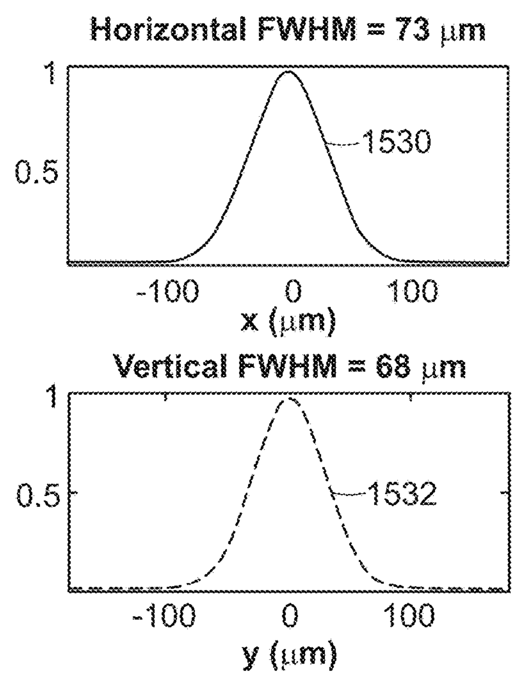
FIG. 15C is a set of graphs detailing cross-section profiles across the (top) horizontal and (bottom) vertical directions.
Figure 16A:
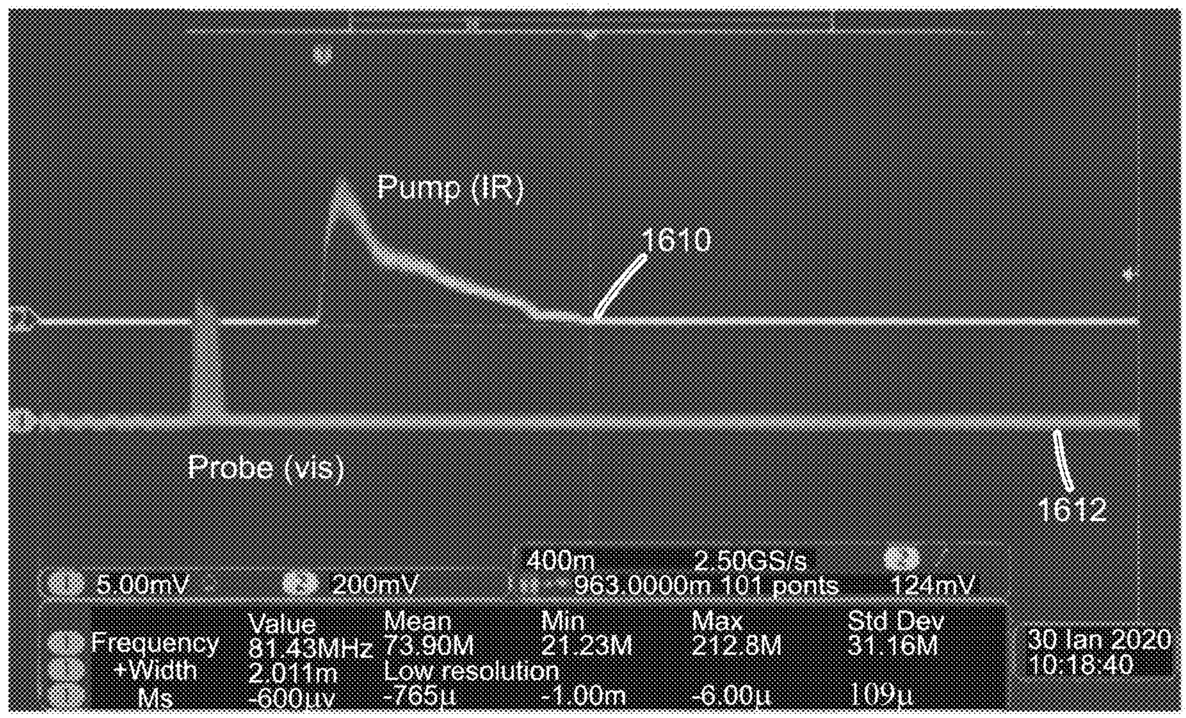
FIG. 16A is an oscilloscope image of the IR pulse shape at ~npump=1729 cm$^{-1}$ (graph line 1610) and visible probe pulse 1=515 nm (graph line 1612).
Figure 16B:
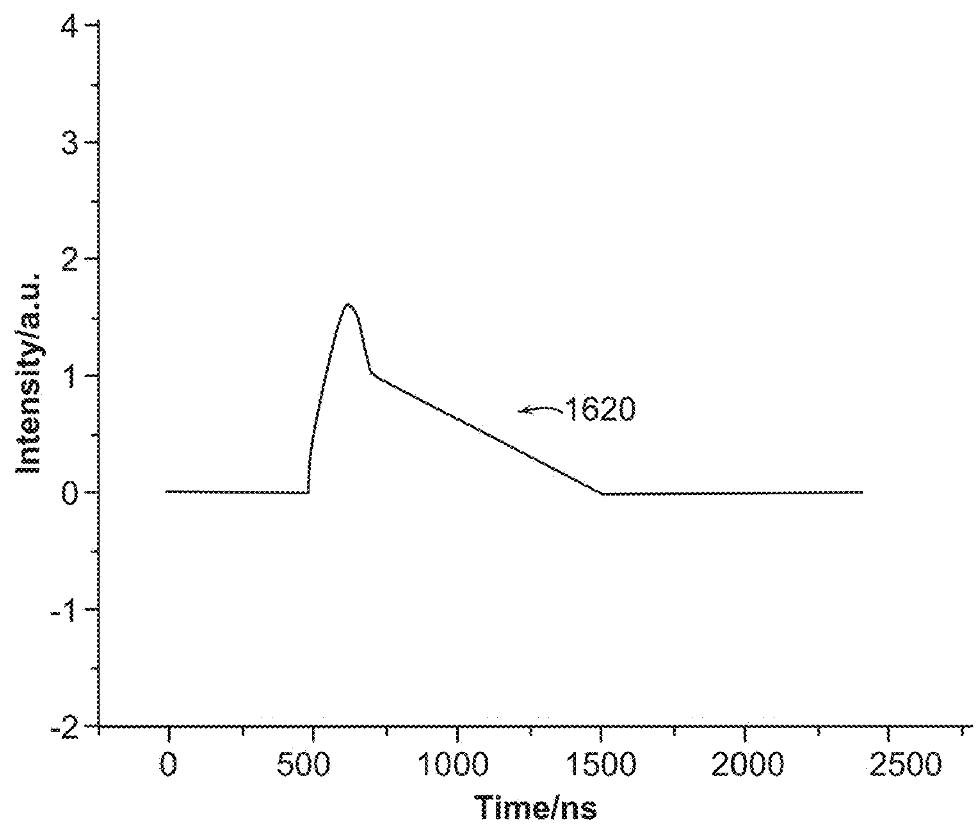
FIG. 16B is a graph of the IR pulse curve fitting obtained by a piecewise function.

The obtained fitting parameters are α=45.27 (is only an arbitrary number, not the real value of intensity), $\sigma_x$=36.5 mm, and $\sigma_y$=33.8 mm. Coordinates of 164 beads with SNR larger than 10 can be found in the image using an open sourceMATLAB function (for example, https://www.mathworks.com/matlabcentral/fileexchange/37388-fast-2d-peak-finder). Using the 164 (x, y, z) coordinates, which were already shifted to the maximum center position, a least squares fitting to a 2D Gaussian function can be performed as shown in FIG. 15B. FIG. 15B is an image 1520 of a normalized fitted Gaussian beam profile. Using the fitting result of the 2D Gaussian function intensity distribution, $$\left(y = \alpha e^{-ln(2)\cdot\left(\frac{x^2}{\sigma_x}+\frac{y^2}{\sigma_y}\right)}\right),$$

the power of the IR beam P and the intensity at center point (a) of the IR beam can be related together by this equation, $$\int\int_\infty \alpha e^{-ln(2)\cdot\left(\frac{x^2}{\sigma_x}+\frac{y^2}{\sigma_y}\right)} dx\ dy = P,$$

which can be simplified to $\alpha\pi\sigma_x\sigma_y/\ln(2)=P$. The IR power P at 1729 $cm^{-1}$ was measured by a power meter (for example, Thorlabs) to be 7.8 mW. Thus, the intensity at the center of the beam can be obtained to be $1.4\times10^6$ $W*m^{-2}$. FIG. 15C includes two graphs depicting horizontal and vertical FWHM. In FIG. 15C, normalized fitted cross-section across the (top) horizontal 1530 and (bottom) vertical 1532 directions are provided. The FWHM of IR beam is 73 μm×68 μm. Additionally in FIG. 15C, $P_{probe}$=0.5 mW, $P_{pump}$=6 mW (200 kHz, half modulation), $\tilde{v}_{pump}$=1729 $cm^{-1}$ vibrational peak of the C═H bond, camera FPS: 400 Hz, $N_{avg}$=1000, and image acquisition time: 5 s. In the following parts of the simulation, the intensity was chosen to be this beam center value. To simulate the heating process, the time-domain IR pulse needs to be modeled. To do so, the present disclosure includes experimentally obtaining the IR pulse signal using an MCT, illustrated in FIG. 16A. FIG. 16A is an oscilloscope image of the curve 1610 IR pulse shape at $\tilde{v}_{pump}$=1729 $cm^{-1}$ and curve 1612 visible probe pulse λ=515 μm. The IR pulse shape which has 1000 ns pulse width is modeled to be a piecewise function as shown in graph line 1620 of FIG. 16B. In FIG. 16B, IR pulse curve fitting obtained by a piecewise function $$\left(\alpha e^{-\frac{1}{2}\left(\frac{1-\tau1}{\sigma}\right)},\right.$$

for 500 ns<t<700 ns;

$$1-\frac{t-\tau2}{\tau3},$$

for 700 ns<t<1500 ns; 0, for otherwise). In FIG. 16B, the fitting parameters are α=1.6, τ1=620 ns, σ=82.51 ns, τ2=700 ns, τ3=800 ns. The first 200 ns time interval is a Gaussian pulse function, and the following 800 ns is a linear function. Having the intensity changing profile and the repetition rate, the time-dependent intensity function (l(t)) of one pulse can be calculated using the aforementioned average intensity.

Figure 17:
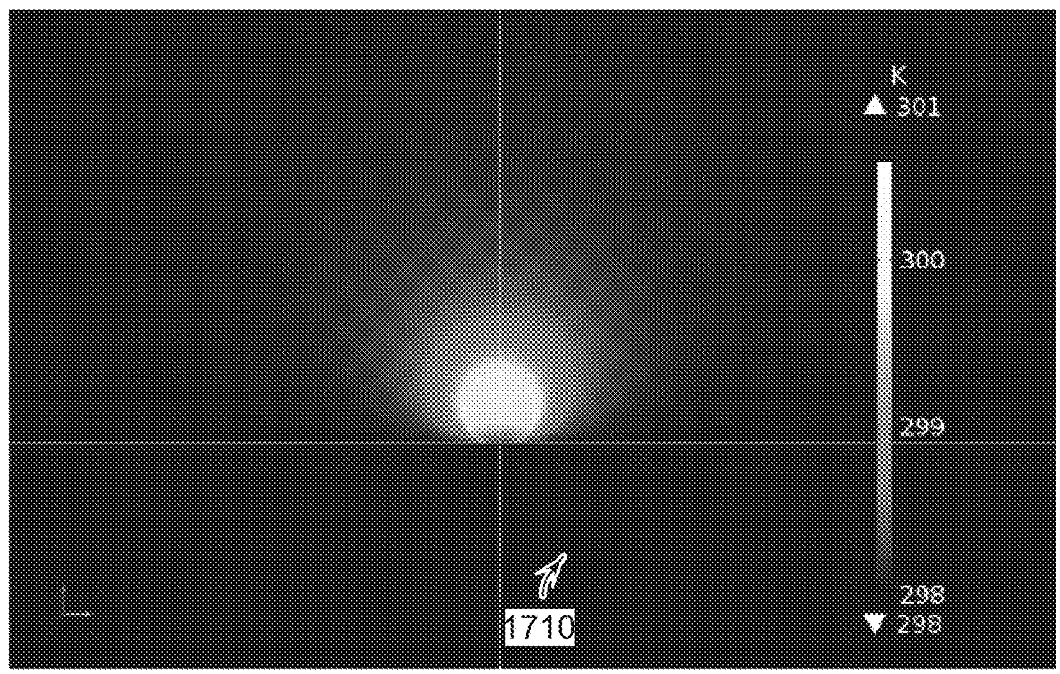
FIG. 17 is an image of the temperature distribution when the 500 nm PMMA bead is heated by the IR pulse.
Figure 18:
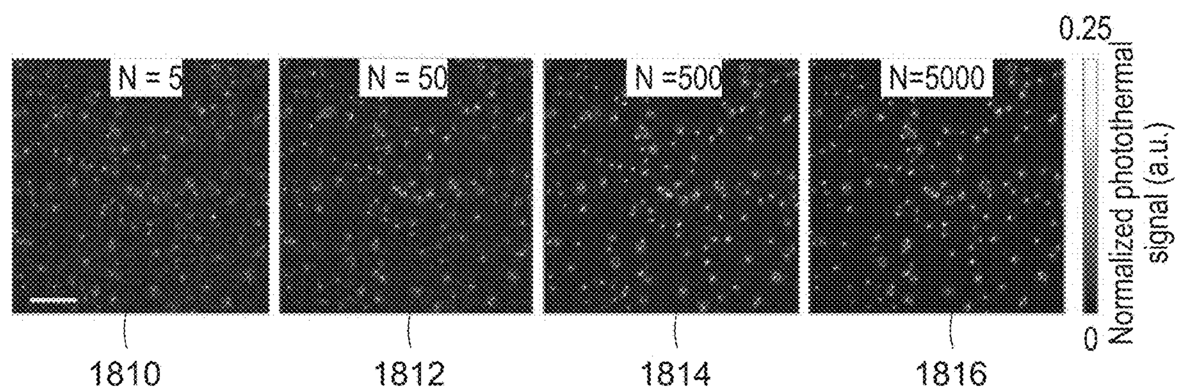
FIG. 18 is a set of images of the photothermal signal of 500 nm PMMA beads at different number (N) of averaged frames.
Figure 19:
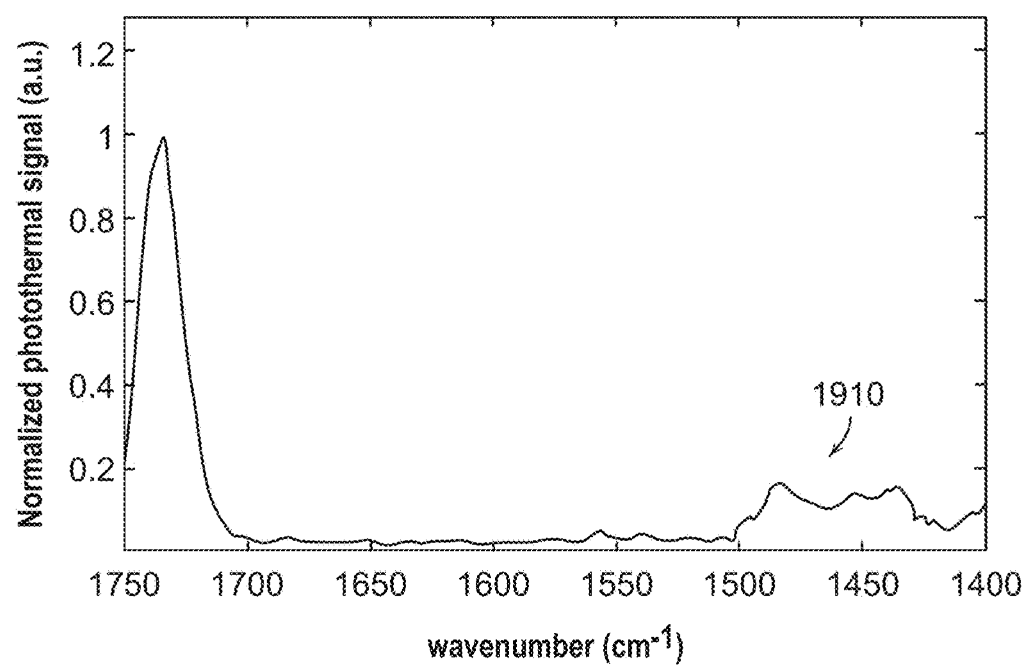
FIG. 19 is a graph detailing the spectrum of 20 individual 500 nm PMMA beads.

Continuing with the illustrative embodiment, the present disclosure next includes simulating the heat dissipation of the bead using the COMSOL 5.3a heat transfer in solid model. The following heat conduction functions were solved in COMSOL. The simulation result of the temperature distribution is shown in FIG. 17, which is an image 1710 of the temperature distribution when the 500 nm PMMA bead is heated by the IR pulse. In FIG. 17, time is at 500 ns after the rising edge of the IR pulse. In this simulation, the 500 nm PMMA bead is sitting on the top of a silicon hemisphere. The contact area radius is 0.4 times of the bead radius. The top hemisphere is air, and the radius of the air hemisphere and the silicon hemisphere is 40 times larger than the bead radius. The temperature at the PMMA silicon interface and the PMMA air interface is assumed to be continuous. The initial temperature before heating is assumed to be 298 K and the most out boundary of this simulation is assumed to have a 298 K constant temperature. Heat convection is not considered in this simulation. The heat source is set to be the domain of the PMMA bead, the heat source term is set to be Q(t) as shown below.

$$\rho C_p \frac{\partial T}{\partial t} + \nabla \cdot q = Q \tag{S3}$$

$$q = -k\nabla T \tag{S4}$$

where ρ is the density of the material, Cp is the heat capacity at constant pressure, T is temperature, t is time, k is the thermal conductivity, and Q is the heat source.

$$Q(t) = \frac{I(t)\sigma_{abs}}{V},$$

is the volume of the 500 nm PMMA bead. In this way, FIG. 18 provides a set of images 1810, 1812, 1814, and 1816 of the photothermal signal of 500 nm PMMA beads at N=5, 50, 500, and 5000 averaged frames, respectively. For parameters, $P_{pump}$=, $\bar{v}_{pump}$=1729 $cm^{-1}$ vibrational peak of the C═H bond, camera FPS: 400 Hz, scale bar: 10 mm. Continuing with the illustrative embodiment, FIG. 19 is a graph detailing the spectrum of 20 individual 500 nm PMMA beads at graph line 1910, with photothermal image acquisition time at each wavenumber: 5 s and total scan time: ~29 mins.

Figure 20A:
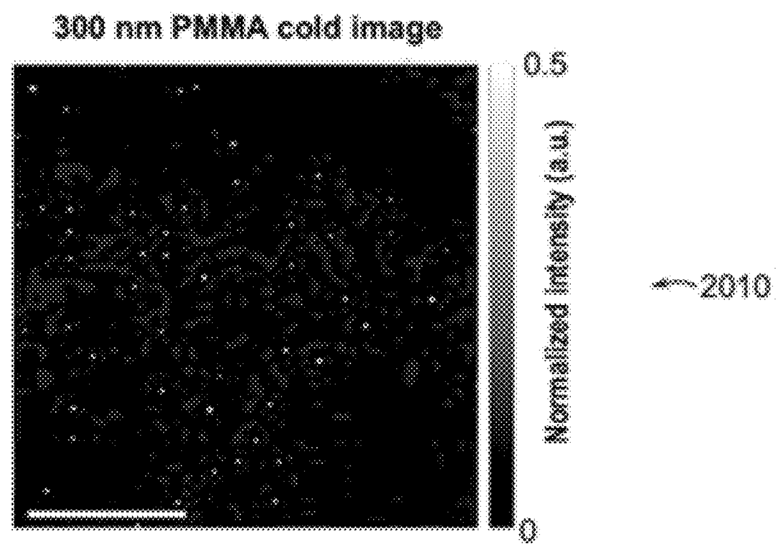
FIG. 20A is a cold photothermal image of the size dependence of the 300 nm PMMA beads.
Figure 20B:
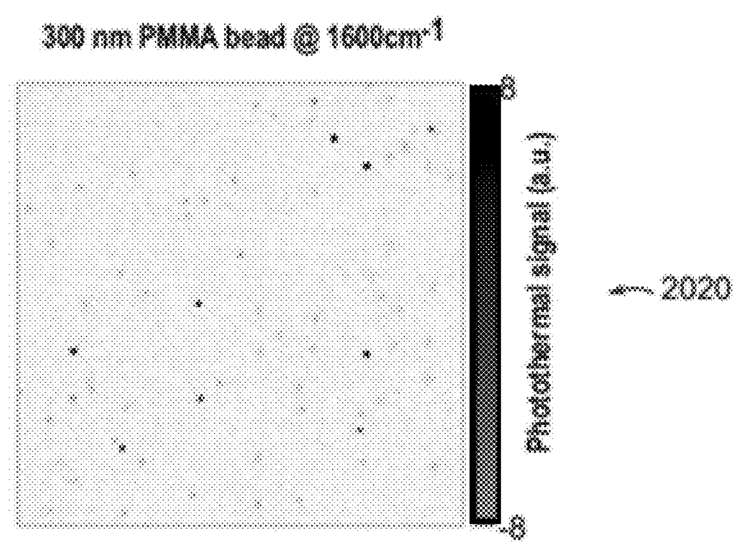
FIG. 20B is a off-resonance photothermal image of the size dependence of the 300 nm PMMA beads.
Figure 21:
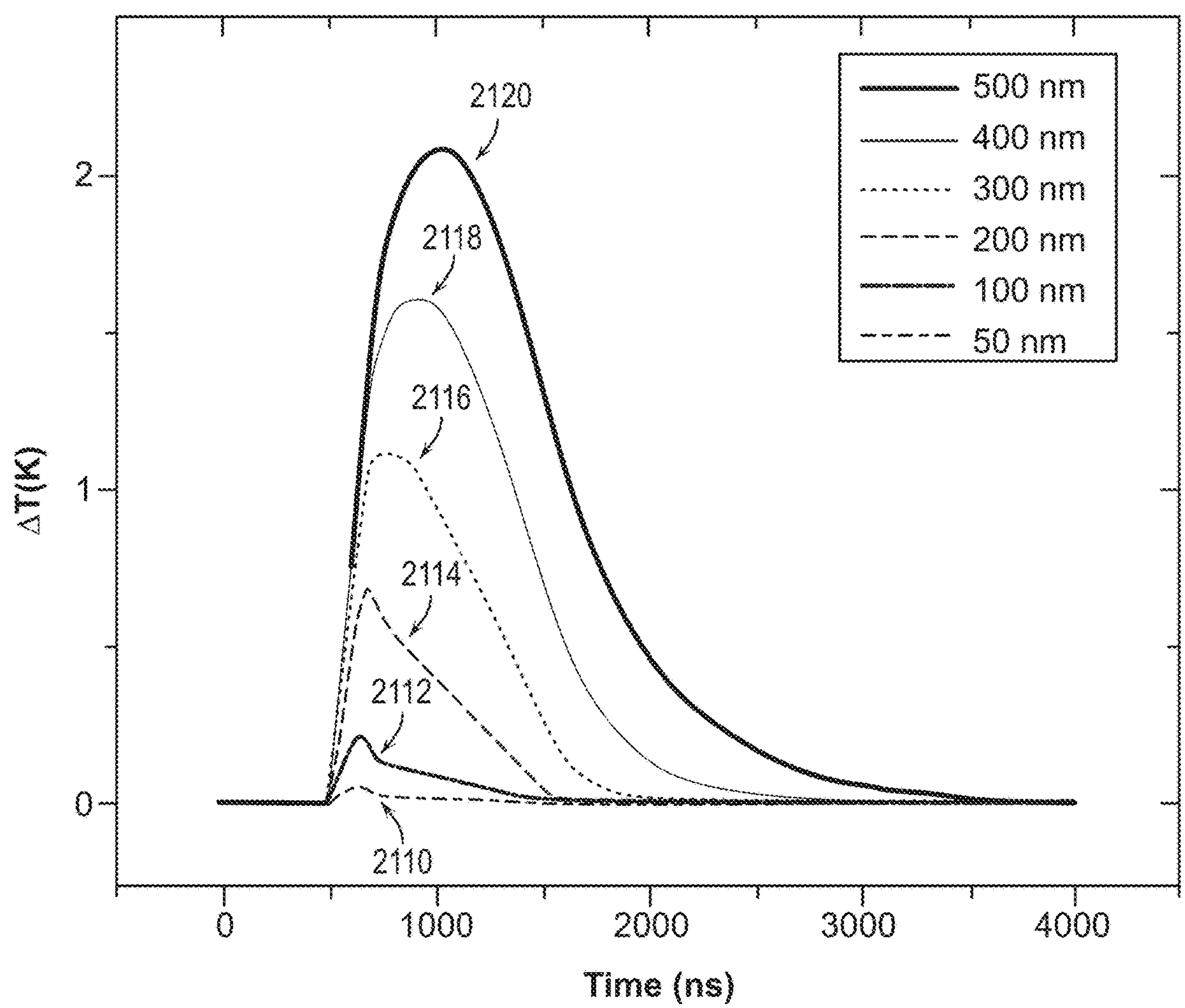
FIG. 21 is a graph of the temperature rising for different sizes of PMMA beads.

According to the exemplary embodiments herein, having the time-dependent temperature distribution, the temperature of the PMMA bead rising curve with time can be obtained. To illustrate this, FIG. 20A includes a cold photothermal image 2010 of the size dependence of the 300 nm PMMA beads. FIG. 20B is a off-resonance photothermal image 2020 of the size dependence of the 300 nm PMMA beads. For both, the IR wavelength is tuned to the 1600 $cm^{-1}$, with a photothermal image acquisition time: 25 s and scale bar: 20 mm. The temperature is calculated from the temperature distribution by integrating the temperature of the whole volume of the PMMA bead and dividing by the volume. FIG. 21 shows the transient temperature response from different size parameters ranging from 50 nm to 500 nm at graph lines 2110, 2112, 2114, 2116, 2118, and 2120. The simulation uses the same parameter as the simulation for 500 nm PMMA bead introduced in previous sections. These plots calculated for the pulse parameters are discussed in the previous section. It is clearly seen that A decreases with size, since the heat dissipation constant is much faster for smaller particles, requiring much shorter IR pulse width.

According to the exemplary embodiments described herein, the present disclosure provides an overview of image acquisition and processing. The automated image acquisition and spectral and defocus scans can be implemented in a custom-written software in Python. This software controls the camera, objective piezo-scanner, pulse generator, and IR-laser via serial communication. The camera and IR laser SDKs should be provided as well. To account for the laser intensity fluctuations, the camera captured the beam reflection from a mirror placed right after the beam splitter. The reflected beam is directed into the bottom-left edge of the camera field-of-view without obscuring the focused IR spot. To prevent the image saturation at this reference region, the intensity of the reflection is adjusted by an absorptive neutral density filter. Each frame is normalized by the average intensity of all pixels at the reference region. This process typically acquires 2000 images in total: 1000 hot and 1000 cold images. The hot and cold frames are recorded sequentially such that the odd and even numbered frames refer to hot and cold, respectively. The frames are summed into the corresponding state frame variable followed by averaging. To avoid overflow in summation, the frames are stored as 32 bits. The frame averaging and normalization are performed in real-time which significantly improves the memory and space usage efficiency. That is to say, instead of saving gigs of image data to average during the post-process, only two averaged hot and cold images (for example, a few MBs) can be saved on disk. This customized process becomes particularly importance of hyperspectral image acquisitions in which order of a million images are captured. It should be noted that only in the signal-to-ratio characterization experiment are all images saved.

According to the exemplary embodiments described herein, the present disclosure provides an overview of sample preparation. As an illustrative example, a 4" double side polished silicon wafer with 500 μm thickness (for example, a University Wafer) is diced to 10 mm×20 mm pieces. Further, 500 nm PMMA beads (MMA500, Phosphorex) can be diluted 10 times with deionized (DI) water and then spin coated on the silicon substrate. The bacterial strains, *S. aureus* ATCC 6538 and *E. coli* BW 25113, used in this illustrative embodiment can be, for example, obtained from the Biodefense and Emerging Infections Research Resources Repository (BEI Resources) and the American Type Culture Collection (ATCC). To prepare bacterial samples for MIP imaging, bacterial strains can first be cultured in, cation-adjusted, for example, Mueller-Hinton Broth (MHB) (Thermo Fisher Scientific) media to reach the logarithmic phase. Next, 1 mL of bacteria sample can be centrifuged, washed twice with purified water, and then fixed by 10% (w/v) formalin solution (for example, from Thermo Fisher Scientific). After centrifuging and washing with the purified water, 2 μL bacteria solution can be deposited on a silicon substrate and dried at room temperature.

Figure 2A:
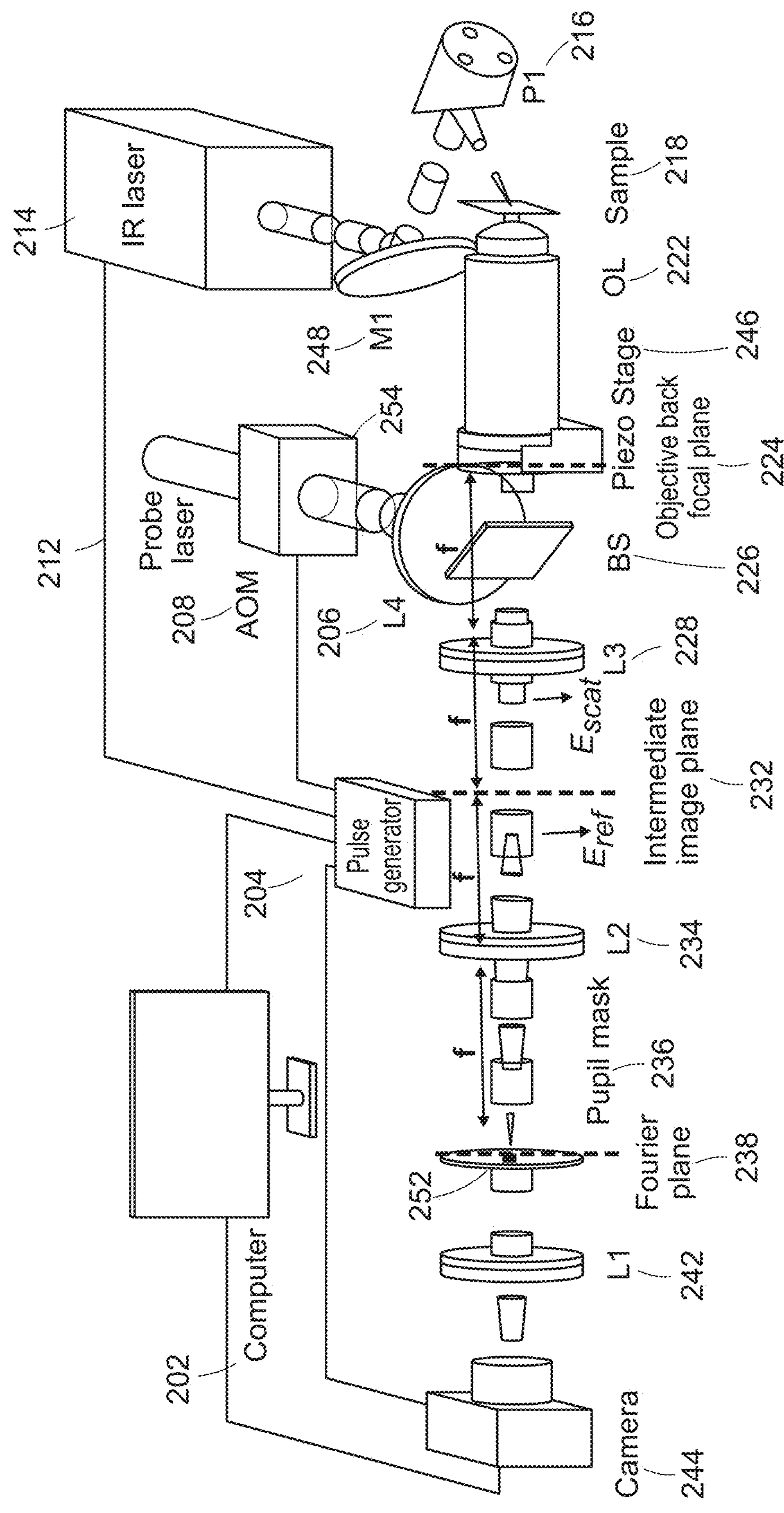
FIG. 2A is a schematic of the pupil engineering and detection concept in a wide-field MIP system.

According to the exemplary embodiments described herein, the present disclosure further includes pupil engineering for objective-type dark-field illumination in an MIP microscope. To illustrate this, FIGS. 2A-2D include schematics and diagrams of an experimental setup of the pupil engineering and detection concept in a wide-field MIP system. In FIG. 2A, the IR beam 214 is provided by a tunable QCL 212 (for example, quantum cascade laser, MIRcat, Daylight solutions). The pump beam (Δ=520 nm central wavelength, Δλ=9/nm bandwidth) is obtained by the second-harmonic generation of a quasi-continuous femtosecond laser 254 (1040 nm, ~100 fs, 80 MHz, Chameleon, Coherent) using a non-linear crystal (not pictured). Such short pulse provides low-temporal coherence length of ~30 μm, yielding nearly speckle-free sample illumination. The femtosecond beam 204 is chopped to pulses (100 ns pulse width) by an acousto-optical modulator 208 (for example, AOM, Gooch and Housego) before entering the non-linear crystal. The IR beam 214 is weakly focused on the sample 218 from the backside by a parabolic mirror 216 (f=15 mm, MPD00M9-M01, Thorlabs). In this embodiment, silicon is chosen as a substrate for two reasons: (1) silicon is transparent at the IR range and (2) back-scattered light from a particle on silicon substrate is about 10 times higher compared with a glass substrate. The p-polarized IR beam 214 incidents on the back side of the silicon substrate obliquely at a θ=60.3 angle to increase the transmission rate.

According to another aspect of the present disclosure, the probe beam 212 is used in Köhler illumination configuration where the probe beam 212 is focused on the back focal plane 224 of the objective lens 222 (50×, 0.8 NA, Nikon) by a condenser (f=75 mm, AC254-075-A, Thorlabs). This provides wide illumination of the sample 218. The objective lens 222 can be mounted on a piezo stage 246 (MIPOS 100 SG RMS, objective focusing system, Piezosystem Jena) to enable fine focus adjustment. Additionally, the piezo scanner 246 eliminates the need for defocus adjustment of the IR beam 214, since the sample 218 z position remains unchanged with respect to the IR focus.

Figure 2B:
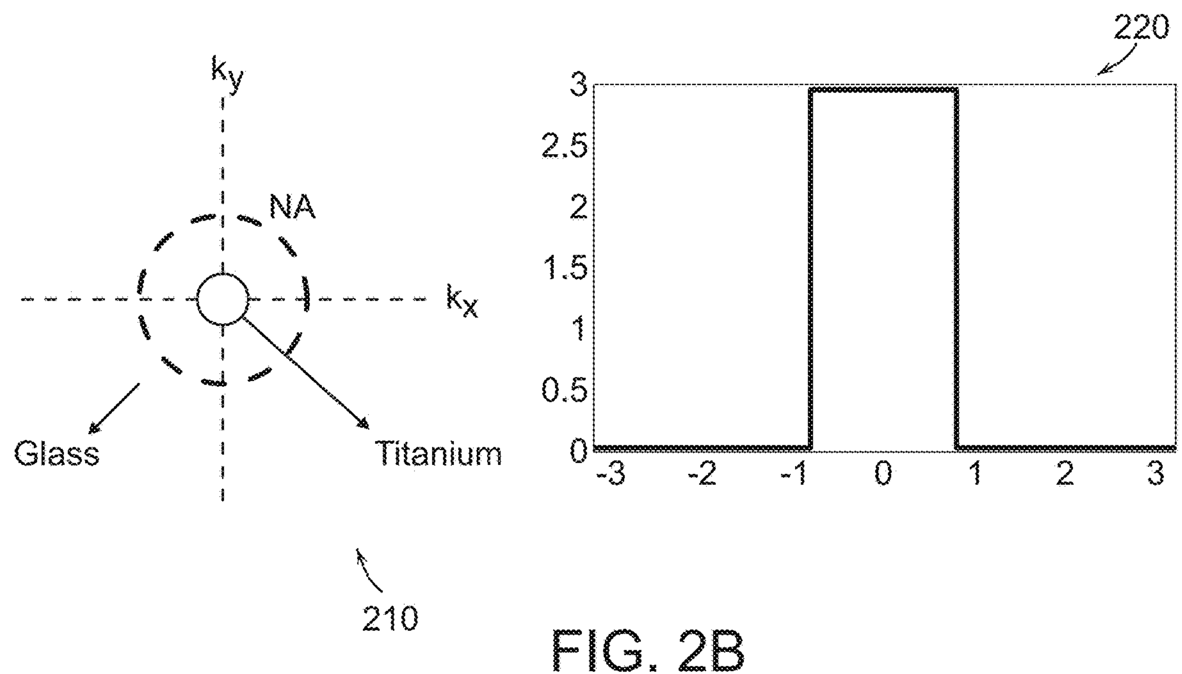
FIG. 2B is a schematic of the absorptive pupil filter drawing in the objective Fourier plane and its optical density (OD) cross-section profile within the objective numerical aperture (NA) range.

More specifically, FIG. 2A is a schematic of the pupil engineering and detection concept in a wide-field MIP system. Notably, the objective-through dark-field illumination is implemented through pupil engineering at the objective pupil's conjugate plane. To achieve this, objective pupil is relayed by a unit magnification 4f system, depicted in the schematic, that uses two identical achromatic doublets 234 and 228, respectively (f=100 mm, AC508-100-A, Thorlabs). As shown in FIG. 2A, the left focal plane 242 of this 4f system (Fourier plane 238) becomes conjugate to the objective pupil. Since the back-reflected light from the substrate is refocused at the objective back pupil, the present disclosure can thereby have access to the reflected light at the conjugate plane. FIG. 2B illustrates a schematic diagram of the absorptive pupil filter drawing in the objective Fourier plane at 220 and its optical density (OD) cross-section profile 210 within the objective numerical aperture (NA) range. To enable the dark-field detection, an aspect of the present disclosure includes blocking a significant amount (1:1000) of the reflected light by a custom fabricated pupil mask 236 placed into the Fourier plane 238.

According to another aspect of the present disclosure, at the center of the mask 236 in FIG. 2A, there can be a dot blocker 252 with the diameter of 1.6 mm. The size of the center block dot 252 is carefully decided by considering a trade-off between the amount of collected scattered photons and alignment difficulty. This only blocks 6% of the pupil while passing a large fraction of the collected scattered light. This estimates 83.7% collection efficiency for the 500 nm beads on silicon. Therefore, the pupil mask 236 can provide quasi-dark illumination of wavelength size particles while maintaining detector at shot-noise-limit operation. As pointed out earlier, photothermal effect broadens the angular distribution of the radiation, yielding a lower directivity compared to dc signal. Consequently, the photothermal collected power drop is 11% for the 1.6 mm blocker, which has 5.3% higher efficiency. As a result, better collection efficiency for smaller particles is expected, since they have much broadened angular distribution owing the Rayleigh scattering. This result also indicates that photothermal modulation depth at high scattering angles becomes larger. Moreover, the present disclosure can be implemented on most of the standard bright-field objectives which offer wide range of availabilities for different applications. This obviates the need for high-cost special objectives which have dark-field ring at their back-pupil. The dark-field ring blocks high-NA part of the objective, reducing the attainable resolution. Therefore, the technique of the present disclosure does not possess challenges associated with the dark-field objectives for epi-detection. In the implementation, an absorptive material, Titanium, is deposited at the center of an optic quality quartz. The titanium thickness is about 80 nm, providing a optical density of ~3. This is almost opaque (~0.1% transmission) compared to the ~80% for glass region. After the pupil mask 236 the dark-field image is formed on a CMOS camera 244 (BFS-U3-17S7, FLIR, dynamic range of 72.46 dB, dark noise of 22.99 $e^-$) by a tube lens (f=200 mm, TTL200-A, Thorlabs). Thereby, the dark-field illumination scheme of the present disclosure provides robust, simple, and low-cost background suppression for contrast-enhancement in epi-detection arrangement.

Figure 2C:
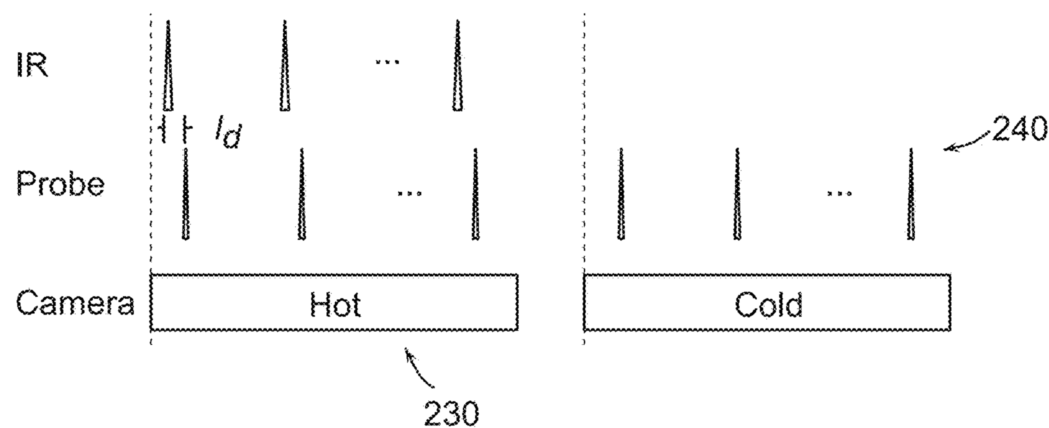
FIG. 2C is a schematic illustrating the synchronized acquisition control triggered by the pulse generator.
Figure 2D:
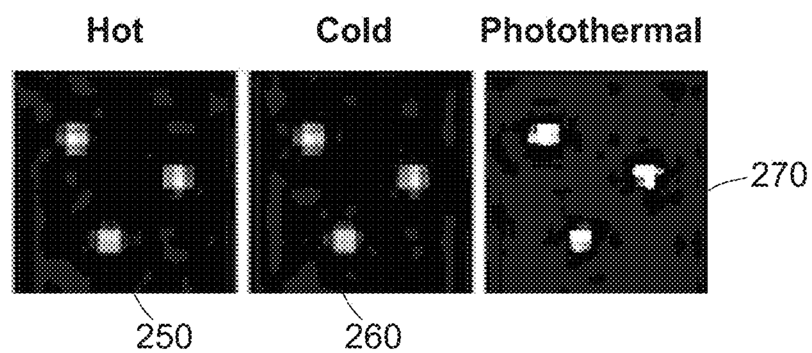
FIG. 2D is a schematic illustrating experimental hot, cold, and photothermal images of 500 nm PMMA beads on silicon substrate.

FIG. 2C shows the synchronization control of the system as triggered by the pulse generator. According to the exemplary embodiments described herein, the present disclosure includes time-gated virtual lock-in camera detection. Photothermal images are acquired by using the virtual lock-in camera detection. A pulse generator 204 (for example, Emerald Pulse Generator, 9254-TZ50-US, Quantum composers) generates the master clock signal at 200 kHz and externally triggers the QCL, AOM 208, and CMOS camera 244 to synchronize the IR pulses 214, probe pulses 212, and camera exposure. The pulse generator 204 has division function that enables separately controlling the pulse duty cycle, amplitude, delay, and width at each output channel. The time delay (C3) between the IR and visible pulses was controlled to measure transient photothermal response via time-gated pump-probe approach. The present disclosure utilizes the AOM 208 channel at the normal mode without changing the duty cycle. The QCL and camera channels were set to the duty cycle mode to create hot and cold frames. The QCL pulse train was chopped electronically at 50% duty cycle, or, every other 1000 IR pulses on and off. Similarly, the camera channel duty cycle was set to 2% to achieve 400 Hz frame rate at the region of interest. In FIG. 2C, the camera readouts "hot" 230 and "cold" 240 frames sequentially and streams to the computer via USB. The pre-determined frame averaging was processed in real-time for computational efficiency, significantly reducing the memory requirements at large number of frames ($O(N)\rightarrow O(1)$), where Nis the frame number). During the image acquisition, the odd and even numbered frames as hot 230 and cold 240 states are set, respectively. This allows for the extraction of the photothermal signal sign, which has size dependency detailed in the results sections. The photothermal image 270 is then obtained by subtracting the hot 250 and cold 260 images of 500 nm PMMA beads on silicon substrate, as shown in FIG. 2D. In the hot image 250, the IR wavelength is tuned to the 1729 $cm^{-1}$ vibrational peak of the C═H bond.

According to the exemplary embodiments described herein, the proof-of-principle experiments for contrast enhancement is demonstrated with 500 nm Polymethyl methacrylate (PMMA) beads to provide experimental verification of contrast enhancement. These beads present an ideal model for the system characterization, as they resemble the particle size and dielectric (n≈1.49) characteristics of bacteria articulated later in an illustrative embodiment. FIGS. 3A-3H compare the dark-field and bright-field MIP imaging results of 500 nm PMMA beads on silicon substrate. The dark-field illumination was achieved by placing the blocker mask at the pupil conjugate plane detailed in the instrumentation section. For a fair comparison, bright-field imaging results were obtained by the same setup at the same conditions without the pupil mask. The exposure time in both cases were adjusted to bring the camera into the saturation level.

Figure 3A:
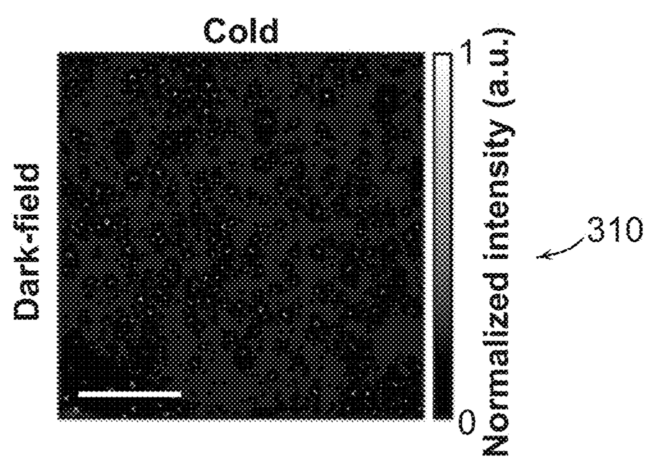
Figure 3B:
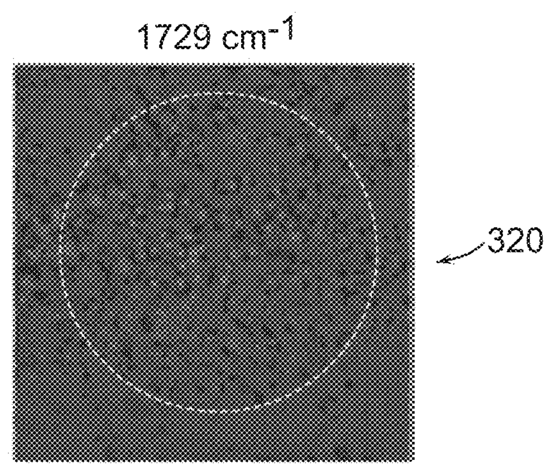
Figure 3F:
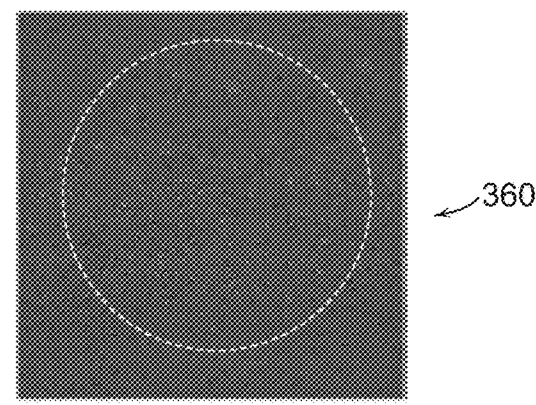
Figure 3G:
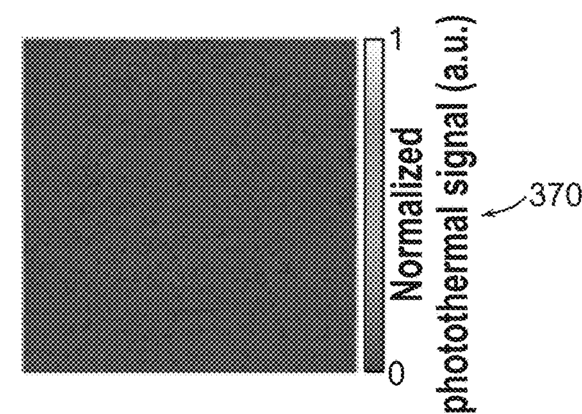
Figure 3H:
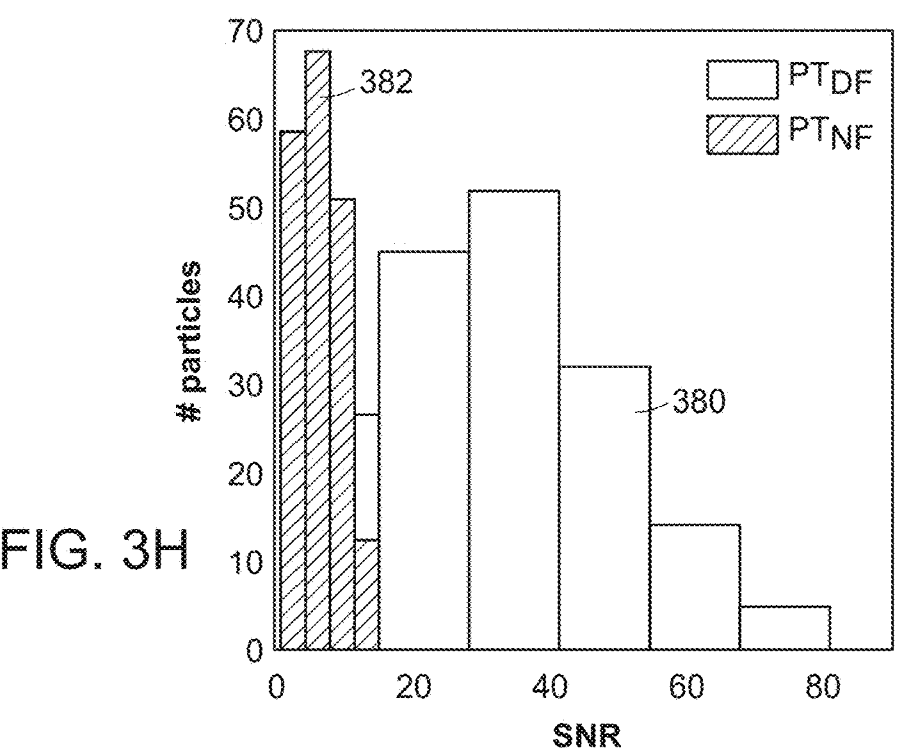

As shown in FIG. 3A-E, the dark-field illumination provides background free DC imaging while the bright-field image has a non-zero background caused by the reflection from the silicon substrate. For reference, in FIG. 3B, the circular white dash illustrates the IR illumination area, with a photothermal image acquisition time: 5 s. IR power: 6 mW @ 1729 $cm^{-1}$, 11.7 mW @ 1600 $cm^{-1}$. Scale bar: 20 μm. FIG. 3A illustrates the dark-field cold image at 310, and FIG. 3B illustrates dark-field photothermal image at 320 depicting the C═O absorption peak. Further, FIG. 3C illustrates the dark-field photothermal image 330 at off-resonance 1600 $cm^{-1}$, with FIGS. 3E-3G illustrating corresponding bright-field images of the same field of view (FIG. 3E corresponds with FIG. 3A, FIG. 3F corresponds with FIG. 3B, and FIG. 3G corresponds with FIG. 3C). Although the non-zero background in the cold or hot images can be canceled by subtraction, the background nonetheless contributes to shot-noise which limits the maximum attainable SNR from a single frame. For example, FIG. 3F shows the background shot-noise clearly at 360, which degrades the visibility of the PMMA beads. In the dark-field photothermal image 320 of FIG. 3B, the background shot noise is eliminated significantly. The cross-section profiles in FIG. 3D of the selected bead in FIGS. 3B and 3F further emphasize this significant background noise suppression at graph lines 340 and 342, respectively. FIG. 3D demonstrates the resolution of the imaging system. The full-width-half-maximum (FWHM) of a 500 nm bead was 433 nm for the dark-field imaging at 340, corresponding with FIG. 3C, and 407 nm for the bright-field imaging at 342, corresponding with FIG. 3F. This result shows that the dark-field illumination approach of the present disclosure can achieve nearly same resolution as in the bright-field illumination. After a Gaussian deconvolution with the particle size, 353 nm lateral resolution is obtained, which is close to the theoretical $$\frac{\lambda}{2 \cdot NA} = 325 \text{ nm}$$

resolution value. The experimental FWHM is slightly larger than the theoretical resolution value because the 500 nm bead is not small enough to be approximately treated to be a point source. To obtain a more quantitative analysis metric, the SNR histograms of 195 PMMA beads were compared in FIG. 3H. The median SNR for the dark-field at 380 is about 6 times larger than bright-field illumination at 382, reaching up to 100 SNR. The SNR improvement of this newly developed dark-field illuminated MIP imaging system has been demonstrated for high-throughput chemical imaging of wavelength size particles.

Figure 4A:
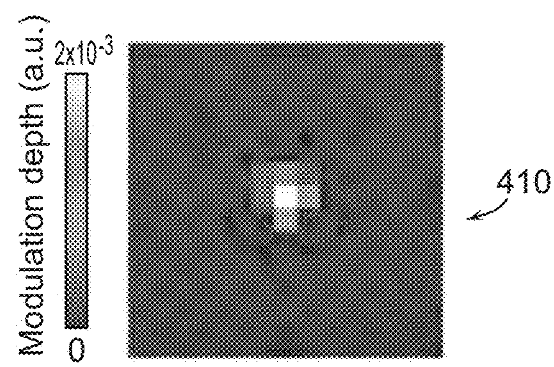
FIG. 4A and FIG. 4B are images of the experimental and simulated photothermal image of a 500 nm PMMA bead at 1729 cm$^{-1}$ respectively.
Figure 4B:
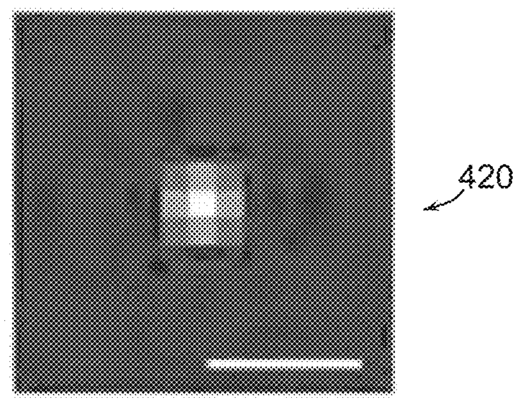
Figure 4C:
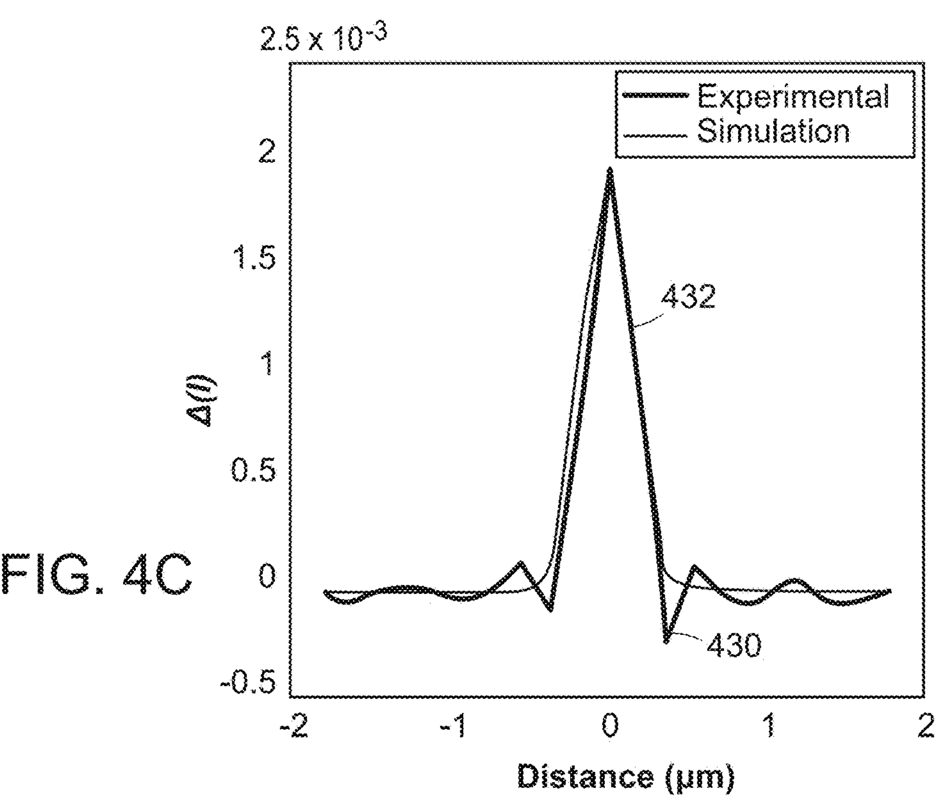
FIG. 4C is a graph of the modulation depth (ΔI/I) cross-section profiles in FIGS. 4A-4B.

According to the exemplary embodiments described herein, the present disclosure includes experimental validation of the aforementioned theoretical calculations. The image formulation framework detailed in the methods section was verified in two steps using the experimental photothermal image of a 500 nm PMMA bead. First, calculate the modulation depth from the BEM simulation using the PMMA's optical and thermal coefficients at ΔT=1 K. Since the modulation depth can be linearly related with the small temperature changes ΔT, ΔT of the PMMA beads can be obtained backward from the experimental results. The experimental photothermal modulation depth image of a 500 nm PMMA bead on silicon substrate is shown in FIG. 4A at 410. The modulation depth was calculated as the ratio between photothermal image and peak contrast value at the cold state. FIG. 4B is a simulation photothermal modulation depth image 420 which is scaled to the same maximum value in FIG. 4A. FIG. 4C illustrates modulation depth (ΔI/I) cross-section profiles in FIGS. 4A-4B at graph lines 430 and 432, respectively; thereby, the cross-section profiles in FIG. 4C show a consistency between the experimental 430 and simulated 432 results. The present disclosure includes then calculating the ΔT histogram for all PMMA beads FIG. 3B as shown in 440 of FIG. 4D. The temperature change is calculated at each bead's peak contrast using the linear relationship with the modulation depth. The maximum temperature rising across the FOV was calculated as ~2 K which is consistent with the COMSOL simulations.

According to another aspect of the present disclosure, the simulated temperature rising 450 and the experimental photothermal signal 452 versus delay scan of 56 individual PMMA beads with a 500 nm diameter is shown in FIG. 4E. For each specific delay value, the photothermal signal 452 is proportional to the integrated temperature change within the time window of the probe pulse, which has a 200 ns pulse width as introduced in the previous section. In other words, the curve shape of the experimental delay scan is a convolution of the simulated temperature curve with the 200 ns probe pulse. FIG. 4E shows that the experimental delay scan curve is not distorted too much compared to the simulation, which means the 200 ns pulse width is short enough to probe the highest temperature change. It should be noted that the transient response curves depend sample size and IR pulse shape. Considering the pulse shape and particle size in this study, the time delay is carefully determined to obtain the maximum photothermal signal during the experiments. The photothermal images are then acquired using the optimized delay scan value corresponds to the highest photothermal signal.

Notably, the photothermal signal scales linearly with the probe power in the shot-noise limit. A maximum SNR in a signal frame is then can be achieved at the camera saturation level. The minute contrast change as a result of photothermal effect can be detected through multiple frame averaging. FIG. 4F shows the noise analysis of 56 PMMA beads over a different number of frames averaging #. The exponential fit to experimental SNR values was found to be $SNR \propto N^{0.43}$. The experimental data at graph line 462 is fit to an exponential function $y=ax^n$ with n=0.43, with a scale bar of 1 μm at graph line 460. The slight variation from the theoretical value of 0.5 could be attributed to the mechanical noise in the imaging system. Overall, this characterization has shown the potential of dark-field MIP microscopy to facilitate highly sensitive hyperspectral imaging of wavelength size particles.

According to the exemplary embodiments described herein, the present disclosure also includes investigation of the size dependence of photothermal signal using 300 nm PMMA beads in diameter. The photothermal image acquisition time is envisioned to be 25 s (5000 frames), with an IR power of 6 mW @ 1729 $cm^{-1}$ and scale bar of 20 μm.

Figure 5A:
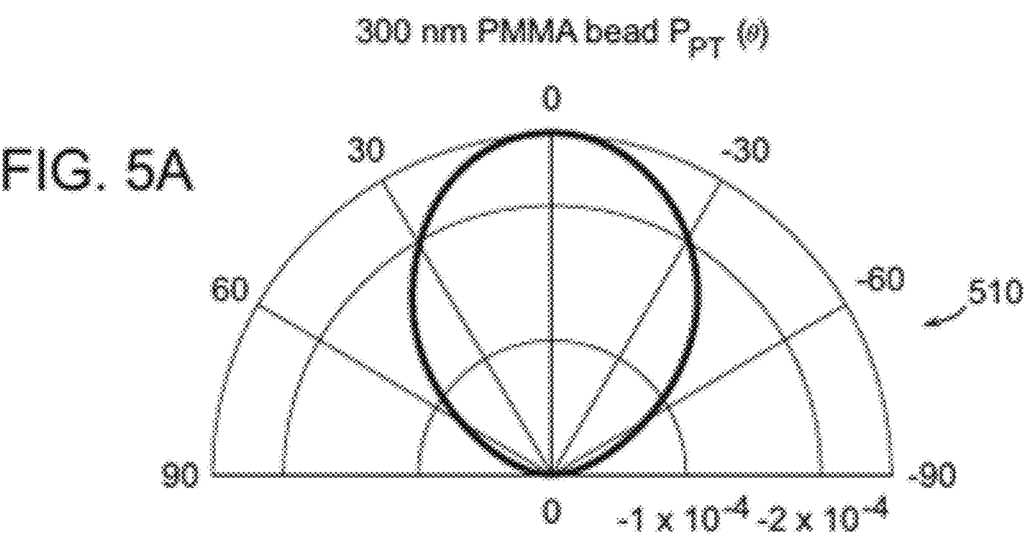
FIGS. 5A-5D include graphs, images, and a plot illustrating size dependence of photothermal signal sign.

FIGS. 5A-5D include graphs, images, and a plot illustrating size dependence of photothermal signal sign. FIG. 5A is a scattering intensity polar plot 510 of the photothermal signal from a PMMA bead of 300 nm diameter. The radiation spreads more uniformly across the angles, indicating a lower directivity compared with the 500 nm PMMA radiation profile in FIG. 1B. This stems from the well-known Mie-scattering fact that far-field scattering angular distribution has strong dependency on the particle size. The directivity of the radiation is inversely proportional to the scatterer's size. It should be noted that both polar plots were normalized by the maximum intensity value at the cold state. More importantly, unlike the positive contrast in 500 nm PMMA beads, 300 nm PMMA beads have negative photothermal contrast. This could be explained by the self-interference between the back-scattered and forward scattered fields from the same particle.

Figure 5B:
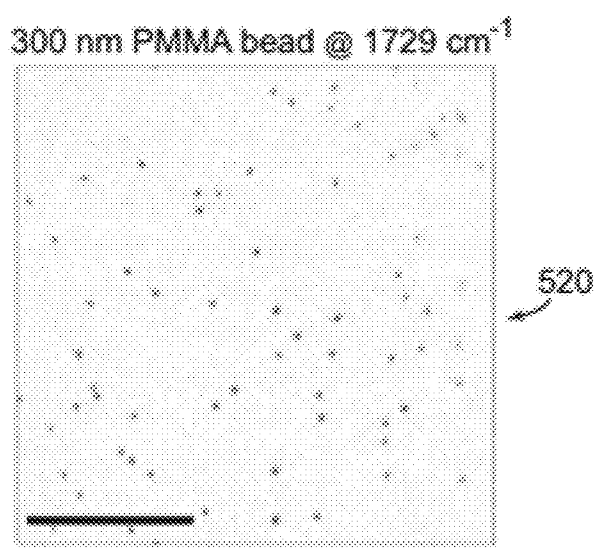
Figure 5C:
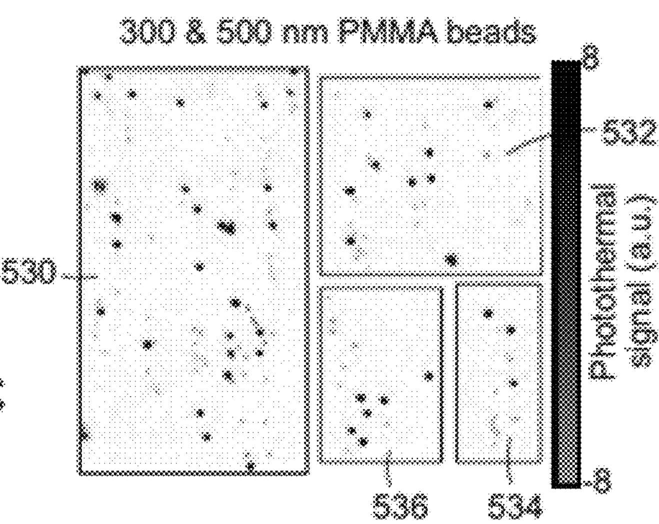
Figure 5D:
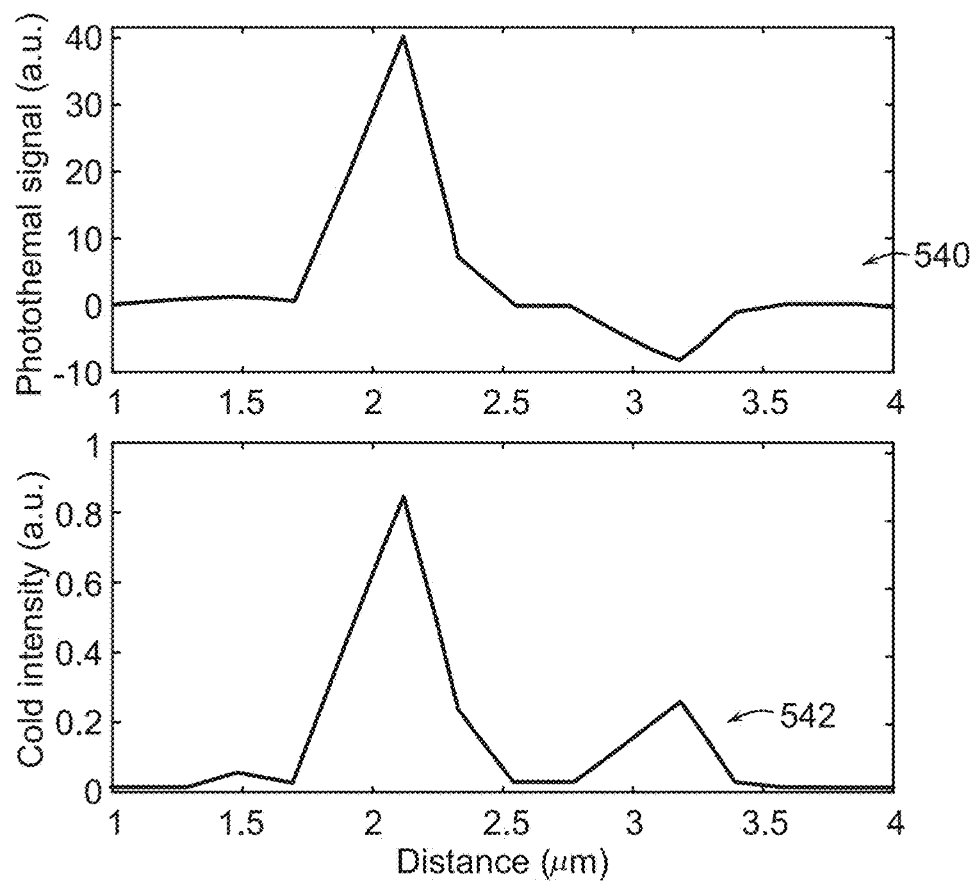

According to another aspect of the present disclosure, this self-interference of scattered fields occurs since the forward scattered fields from particles reflect back from the substrate surface. The forward scattered light becomes less dominant for the smaller particles due to the Mie-scattering phenomena. Therefore, the photothermal contrast sign flip is likely to happen when the amplitude of the forward scattered field decreases. This is verified using sign inversion using 300 nm PMMA bead sample. FIG. 5B shows photothermal image 520 of the 300 nm PMMA beads with an SNR of 44 at frequency of 1729 $cm^{-1}$. This is further verified using a mixed 500 and 300 nm PMMA beads sample in FIG. 5C, which depicts the cropped photothermal images of 300 and 500 nm PMMA beads mixture at 530, 532, 534, and 536. Depending on the particle size, the photothermal signals from different particles yielded positive or negative contrast in a single FOV.

Notably, the experimental findings show great agreement with the theoretical predictions. The cross-section profiles in FIG. 5D demonstrates a clearer comparison of scattered intensity and contrast flip by illustrating the cross-section profile of the line 430 in FIG. 4C at graph line 540 and the corresponding profile in the cold image at graph line 542. Due to the sixth power dependence ($r^6$) of the scattered signal, 300 nm beads yield lower DC contrast. Moreover, the temperature rise for smaller particles become less due to the faster thermal decay in the orders of a few hundreds of nanoseconds, requiring shorter pump and probe pulse widths. Both reasons caused lower photothermal SNR for 300 nm beads. To obtain high SNR images with good data fidelity in these proof-of-concept experiments, the number of frame averaging is increased by five-fold to 5000.

Figure 6A:
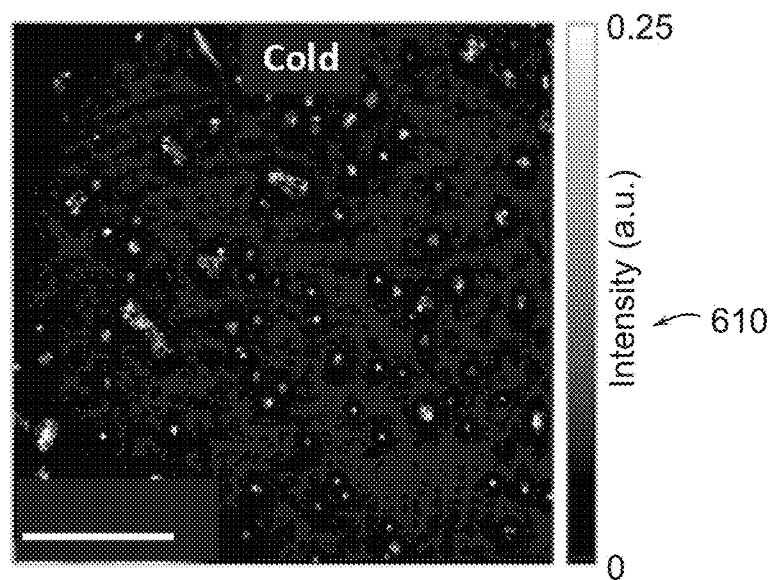
FIG. 6A-6E include images and a graph of multispectral dark-field MIP imaging of *S. aureus*.
Figure 6B:
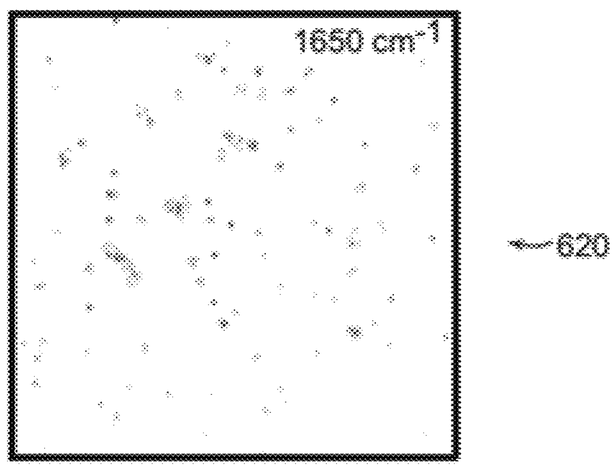
Figure 6C:
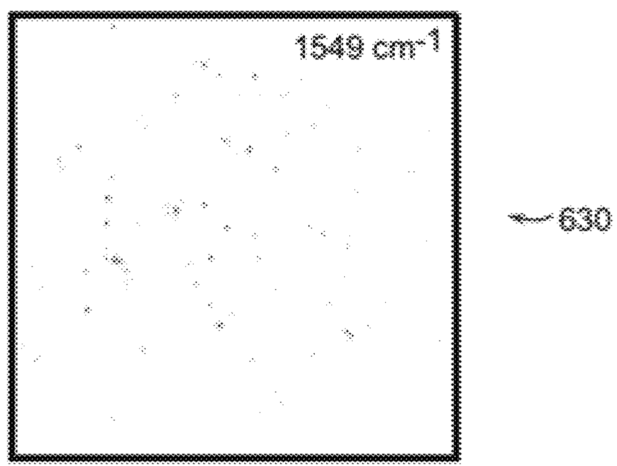
Figure 6D:
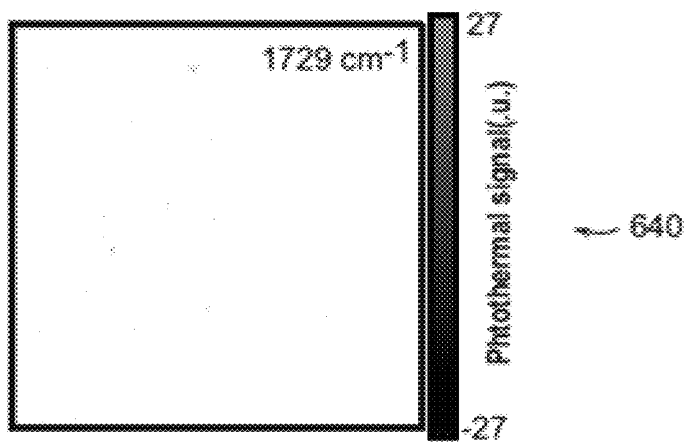
Figure 6E:
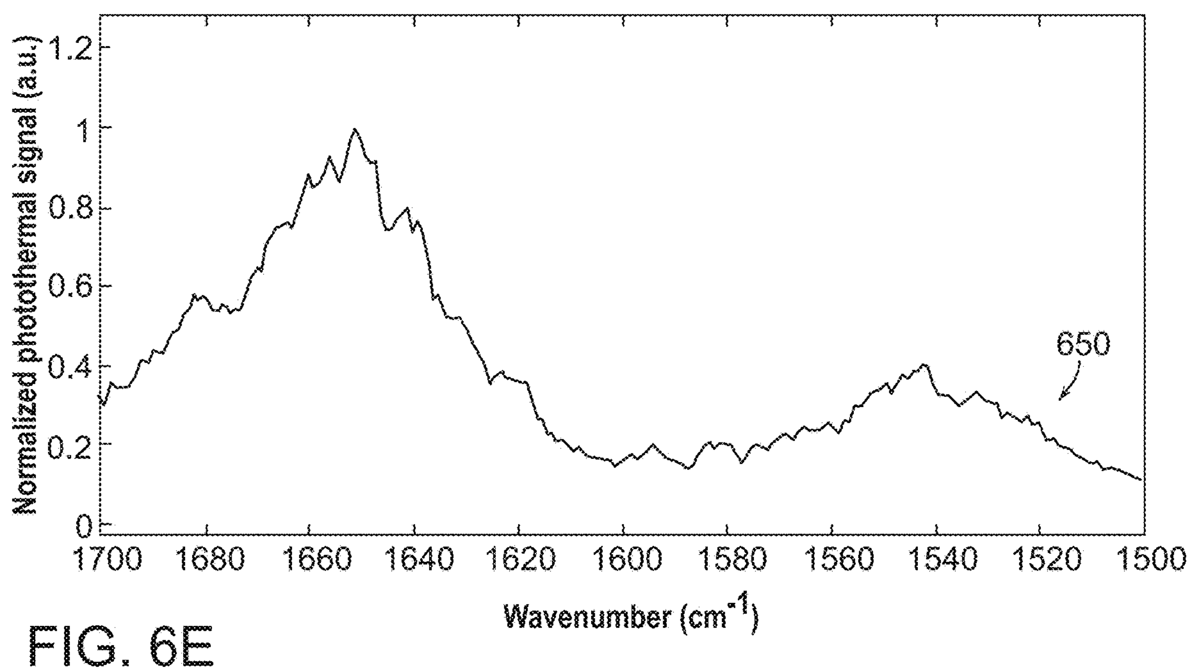

An illustrative embodiment of the dark-field microscopy of the present disclosure includes fingerprinting single bacteria. To demonstrate on biological specimens, two bacteria species with various size and shape distribution are presented as examples. The bacteria were directly immobilized on the silicon substrate at room temperature. FIGS. 6A-6D include images illustrating multispectral dark-field MIP imaging of *S. aureus*. Therein, the photothermal image acquisition time is 5 s (1000 frames), IR power: 6 mW @ 1729 $cm^{-1}$, 11.9 mW @ 1650 $cm^{-1}$, 8.7 mW @ 1549 $cm^{-1}$, as MIP spectrum is normalized by the IR power with a scale bar of 20 μm. Spherical *S. aureus* bacteria in the fingerprint region was first imaged. FIG. 6A demonstrates the dark-field cold image in which the single *S. aureus* cells appear to be in round shape at 610. The intensity variation across the bacteria indicates size differences of *S. aureus* cells. When IR frequency was tuned to the amide I band at 1650 $cm^{-1}$, which is a characteristic band in proteins, the bacteria show high-contrast photothermal signal with an SNR of 93, as illustrated in 620 of FIG. 6B. Another major protein band of amide II at 1549 $cm^{-1}$, as illustrated in 630 of FIG. 6C, is then selected. In contrast to amide I, amide II generates lower photothermal contrast owing to the weaker absorption. When IR is tuned 1729 $cm^{-1}$, associated with C═O bond which is abundant in lipids, a very weak contrast was observed as a result of low lipid content in the *S. aureus*, as illustrated in 640 of FIG. 6D. Furthermore, FIG. 6E shows spectrum of 12 individual bacteria from 1700 $cm^{-1}$ to 1500 $cm^{-1}$ with step size of 1 $cm^{-1}$ at graph line 650.

Figure 7A:
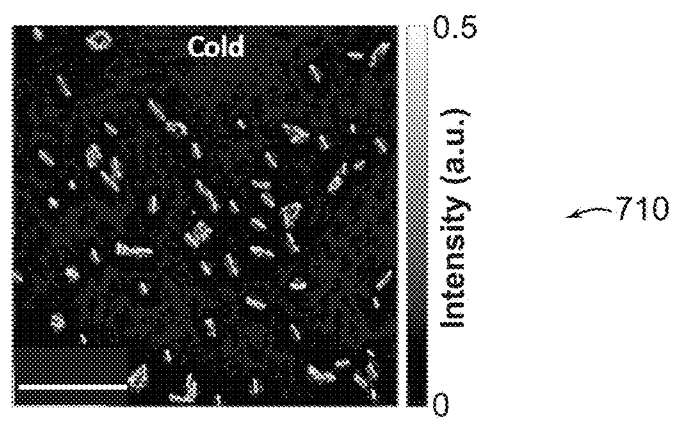
Figure 7B:
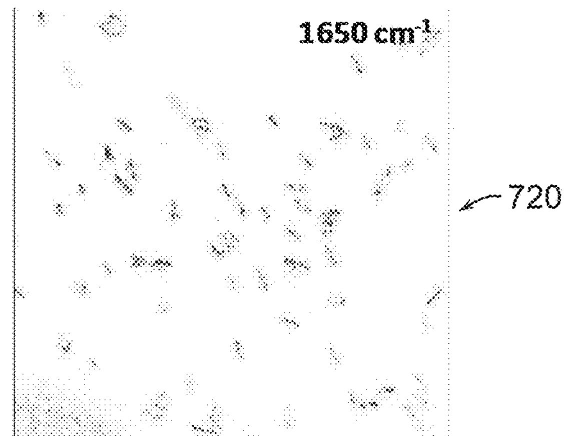

The performance of dark-field MIP for bacterial imaging, according to the present disclosure, is also verified, as shown in FIGS. 7A-7E in demonstrating hyperspectral characterization of rod-shaped *E. coli* bacteria in the fingerprint region, including images illustrating multispectral dark-field MIP imaging of *E. coli*. Therein, the photothermal image acquisition time is 5 s (1000 frames), IR power: 6 mW @ 1729 cm-1, 11.9 mW @ 1650 cm-1, 8.7 mW @ 1549 cm-1, as MIP spectrum is normalized by the IR power with a scale bar of 20 μm. FIG. 7A shows scattered intensity image of *E. coli* by illustrating its dark-field cold image at 710. Further, FIGS. 7B-7D illustrate the dark-field photothermal images of *E. coli* at specific wavenumbers for different chemical bonds. FIGS. 7B-D compare photothermal images of amide I, amide II, and off-resonance bands at frequencies of 1650 $cm^{-1}$ and corresponding 720, 1549 $cm^{-1}$ and corresponding 730, and 1729 $cm^{-1}$ and corresponding 740, respectively. This example involves obtaining about four-fold lower SNR of 25 compared with the large *S. aureus* cells due to the smaller diameter of *E. coli* bacteria. The photothermal contrast at the bacteria center was always positive owing to their uniform diameter distribution. This example involves further obtaining spectra of 10 bacteria, as illustrated in graph line 750 of FIG. 7E, which details the dark-field MIP spectrum of *E. coli*. The *E. coli* and *S. aureus* spectra show different curves across the amide I and II bands. This observation heads potential applications in high-throughput single bacteria characterization and classification.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A wide-field mid-infrared photothermal microscopy (MIP) system for analyzing a sample on a substrate using dark-field illumination, comprising:

a mid-infrared (IR) optical source configured to generate a mid-infrared beam, the mid-infrared beam being directed at the sample to heat the sample;

a visible light source for generating a light, the light illuminating the sample on the substrate and creating a scattered field and a reflected field along a collection path of the system, wherein the MIP system is configured to simultaneously heat the sample with the mid-infrared optical source while imaging the sample with the visible light source;

a pupil mask positioned along the collection path to block the reflected field while allowing the scattered field to pass therethrough, wherein the pupil mask centrally houses a dot blocker to block the reflected field; and a camera positioned at an end of the collection path to collect the scattered field and generate a dark-field image of the sample.

2. The system of claim 1, wherein the collection path includes two identical achromatic doublet lenses through which the light illuminating the sample on the substrate passes.

3. The system of claim 2, wherein the collection path includes a high numerical aperture objective lens.

4. The system of claim 3, wherein the collection path includes a CMOS imaging sensor for detecting light along the collection path.

5. The system of claim 1, wherein the pupil mask is configured to adjust specularly reflected light for optimization of interferometric signal.

6. The system of claim 1, wherein the pupil mask provides quasi-dark illumination of wavelength size particles while maintaining detector at shot-noise-limit operation so that no reflected light from the substrate reaches the visible light source.

7. The system of claim 1, wherein the pupil mask provides a photothermal effect broadening the angular distribution of radiation.

8. The system of claim 7, wherein the broadening of the angular distribution of the radiation yields a lower directivity compared to dc signal.

9. The system of claim 1, wherein the pupil mask blocks 1:1000 of the reflected light by being placed into a Fourier plane.

10. The system of claim 9, wherein an absorptive material is deposited at the center of an optic quality quartz disposed on the pupil mask.

11. The system of claim 1, wherein the dot blocker filters the reflected illuminating light from the substrate.

12. The system of claim 11, wherein the dot blocker has a diameter of 1.6 mm.

13. The system of claim 12, wherein the dot blocker blocks 6% of a pupil while passing a large fraction of collected scattered light.

14. The system of claim 13, wherein a photothermal collected power drop is 11% for the 1.6 mm blocker.

15. The system of claim 14, wherein the system for analyzing a sample on a substrate using dark-field illumination can be implemented on most of the standard bright-field objectives.

16. The system of claim 1, wherein the illuminating light reflected from the substrate and refocused at the objective back pupil allows for access to the reflected light at a conjugate plane.

17. The system of claim 1, wherein the visible light source includes at least one of a narrow-band light source, an LED light source, a monochromatic light source, a laser light source and a visible light source.

18. A wide-field mid-infrared photothermal microscopy (MIP) system for analyzing a sample on a substrate using dark-field illumination, comprising:

a mid-infrared (IR) optical source configured to generate a mid-infrared beam, the mid-infrared beam being directed at the sample to heat the sample;

a visible light source for generating a light, the light illuminating the sample on the substrate and creating a scattered field and a reflected field along a collection path of the system, wherein the scattered field is refocused at an objective back pupil conjugate with a focal plane, wherein the MIP system is configured to simultaneously heat the sample with the mid-infrared optical source while imaging the sample with the visible light source;

a pupil mask positioned along the collection path to block the reflected field while allowing the scattered field to pass therethrough, wherein the pupil mask centrally houses a dot blocker to block the reflected field; and a camera positioned at an end of the collection path to collect the scattered field and generate a dark-field image of the sample.

19. A wide-field mid-infrared photothermal microscopy (MIP) method for analyzing a sample on a substrate using dark-field illumination, comprising:

generating a mid-infrared beam from a mid-infrared (IR) optical source, the mid-infrared beam being directed at the sample to heat the sample;

generating a light from a visible light source for, the light illuminating the sample on the substrate and creating a scattered field and a reflected field along a collection path of the system, wherein the MIP system is configured to simultaneously heat the sample with the mid-infrared optical source while imaging the sample with the visible light source;

blocking the reflected field with a pupil mask positioned along the collection path while allowing the scattered field to pass therethrough, wherein the pupil mask centrally houses a dot blocker to block the reflected field; and collecting the scattered field with a camera positioned at an end of the collection path and generating a dark-field image of the sample.

* * * * *